US010794269B2

(12) United States Patent
Eriksson

(10) Patent No.: US 10,794,269 B2
(45) Date of Patent: Oct. 6, 2020

(54) TURBOCHARGER UNIT

(71) Applicant: VOLVO TRUCK CORPORATION, Gothenburg (SE)

(72) Inventor: Pontus Eriksson, Helsingborg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 214 days.

(21) Appl. No.: 15/737,328

(22) PCT Filed: Dec. 22, 2015

(86) PCT No.: PCT/EP2015/081014
§ 371 (c)(1),
(2) Date: Dec. 18, 2017

(87) PCT Pub. No.: WO2017/001029
PCT Pub. Date: Jan. 5, 2017

(65) Prior Publication Data
US 2018/0163620 A1 Jun. 14, 2018

Related U.S. Application Data

(63) Continuation-in-part of application No. PCT/EP2015/065148, filed on Jul. 2, 2015.

(51) Int. Cl.
*F02B 67/10* (2006.01)
*F02B 37/00* (2006.01)
(Continued)

(52) U.S. Cl.
CPC ............... *F02B 67/10* (2013.01); *F01P 3/20* (2013.01); *F02B 37/00* (2013.01); *F02B 39/005* (2013.01);
(Continued)

(58) Field of Classification Search
CPC ........ F02B 39/14; F02B 37/00; F02B 39/005; F02B 67/10; F01P 3/20; F02F 11/00
(Continued)

(56) References Cited

U.S. PATENT DOCUMENTS 3,560,124 A * 2/1971 Bergere .................. F16B 19/05
411/361
4,716,735 A * 1/1988 Ruf .......................... F01D 25/24
180/291
(Continued)

FOREIGN PATENT DOCUMENTS

CN 104204448 A 12/2014
EP 2042706 A2 4/2009
(Continued)

OTHER PUBLICATIONS

International Search Report (dated Mar. 29, 2016) for corresponding International App. PCT/EP2015/081014.
(Continued)

*Primary Examiner* — Thai Ba Trieu
(74) *Attorney, Agent, or Firm* — Venable LLP; Jeffri A. Kaminski

(57) ABSTRACT

An engine structure forming an adapter for connecting a turbocharger unit to a cylinder block of an internal combustion engine includes a set of attachment arrangements for fastening the turbocharger unit to the cylinder block via the engine structure such that the engine structure is positioned in between the turbocharger unit and the cylinder block. The engine structure includes at least one fluid channel extending in a bent manner from a first surface of the engine structure to a second surface of the engine structure.

19 Claims, 18 Drawing Sheets

(51) Int. Cl.
*F02B 39/00* (2006.01)
*F02B 39/14* (2006.01)
*F01P 3/20* (2006.01)
*F02F 11/00* (2006.01)
*F01D 25/28* (2006.01)

(52) U.S. Cl.
CPC .............. *F02B 39/14* (2013.01); *F02F 11/00* (2013.01); *F01D 25/28* (2013.01); *F01P 2060/12* (2013.01); *F05D 2220/40* (2013.01); *Y02T 10/144* (2013.01)

(58) Field of Classification Search
USPC .............................................. 60/605.1, 605.3
See application file for complete search history.

(56) References Cited

U.S. PATENT DOCUMENTS

| | | | |
|---|---|---|---|
| 5,261,237 A * | 11/1993 | Benson | F01M 9/108 417/407 |
| 5,392,604 A | 2/1995 | Nikula et al. | |
| 6,499,884 B1 * | 12/2002 | Svihla | F01D 25/162 384/138 |
| 8,997,487 B2 * | 4/2015 | Drangel | F02B 39/005 417/407 |
| 2002/0155009 A1 * | 10/2002 | Panos | F01D 25/16 417/407 |
| 2003/0005694 A1 | 1/2003 | Pleuss et al. | |
| 2004/0168441 A1 | 9/2004 | Dumas et al. | |
| 2007/0047605 A1 | 3/2007 | Barkan | |
| 2009/0184229 A1 | 7/2009 | Peltier | |
| 2009/0320469 A1 | 12/2009 | Palazzolo et al. | |
| 2011/0302920 A1 | 12/2011 | Cuniberti et al. | |
| 2013/0004291 A1 * | 1/2013 | Williams | F01D 25/16 415/1 |
| 2013/0047605 A1 * | 2/2013 | Drangel | F02B 39/005 60/605.1 |
| 2015/0000272 A1 * | 1/2015 | Balsley, II | F02B 37/12 60/605.1 |
| 2016/0265554 A1 * | 9/2016 | Annati | F04D 29/624 |
| 2016/0273551 A1 * | 9/2016 | Uesugi | F04D 29/4206 |
| 2018/0045075 A1 * | 2/2018 | Eriksson | F01D 25/16 |

FOREIGN PATENT DOCUMENTS

| | | | |
|---|---|---|---|
| EP | 2543846 A1 * | 1/2013 | ........... F02B 39/005 |
| GB | 2180596 A | 4/1987 | |
| JP | S6216716 U | 1/1987 | |
| JP | H0261134 U | 5/1990 | |
| JP | H05214950 A | 8/1993 | |
| JP | H09329266 A | 12/1997 | |
| JP | 2008274904 A | 11/2008 | |
| JP | 2010106699 A | 5/2010 | |
| JP | 2010127073 A | 6/2010 | |
| WO | WO-2008128789 A1 * | 10/2008 | ......... B60R 13/0838 |
| WO | 2008149060 A1 | 12/2008 | |
| WO | 2013142090 A1 | 9/2013 | |
| WO | 2015088397 A1 | 6/2015 | |

OTHER PUBLICATIONS

Japanese Office Action dated Jan. 7, 2020 in JP Application No. 2017-568327, 14 pages.
First Office Action issued in corresponding Chinese Patent Application No. 201580081426.7, dated Oct. 8, 2019.

* cited by examiner

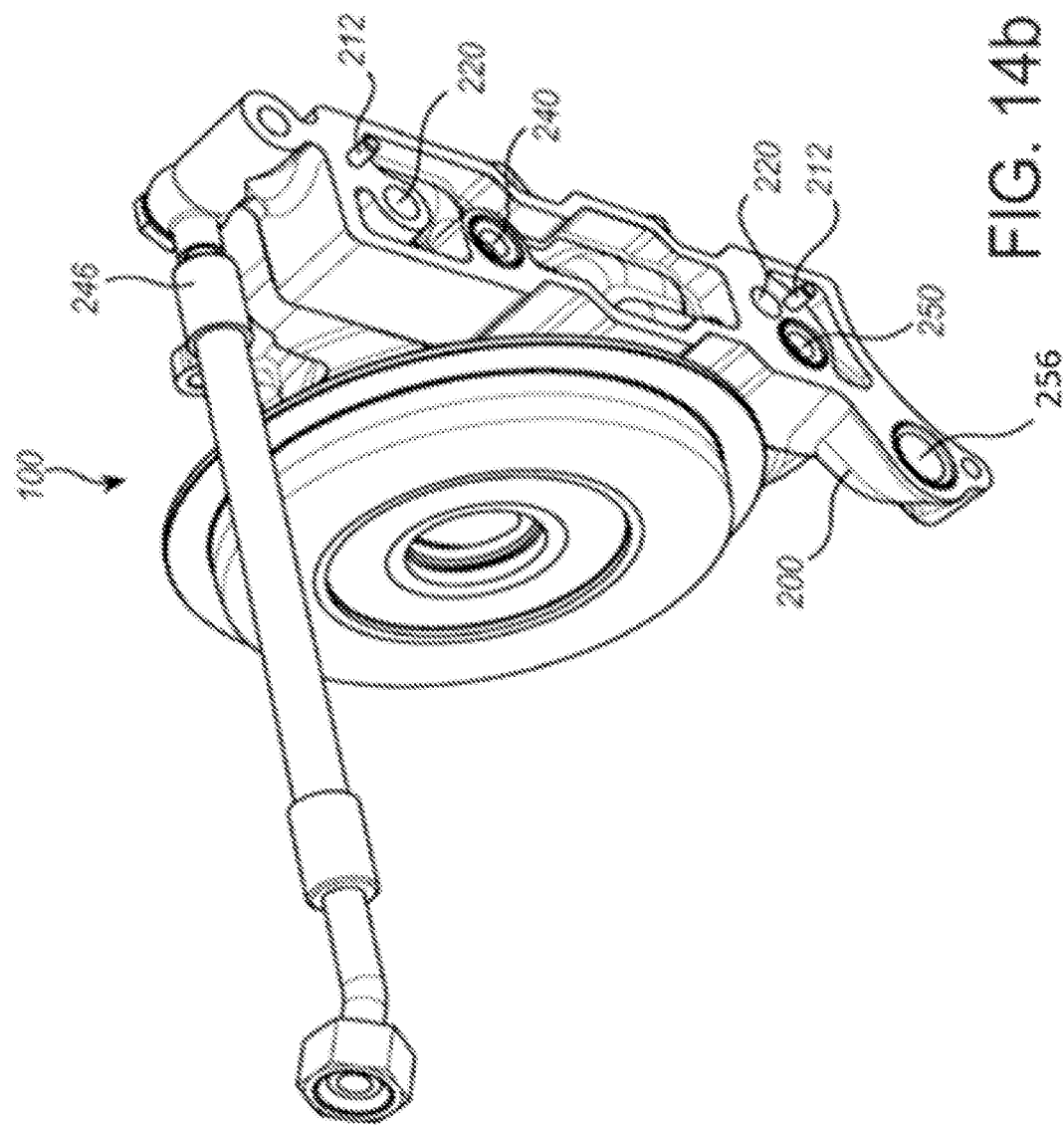

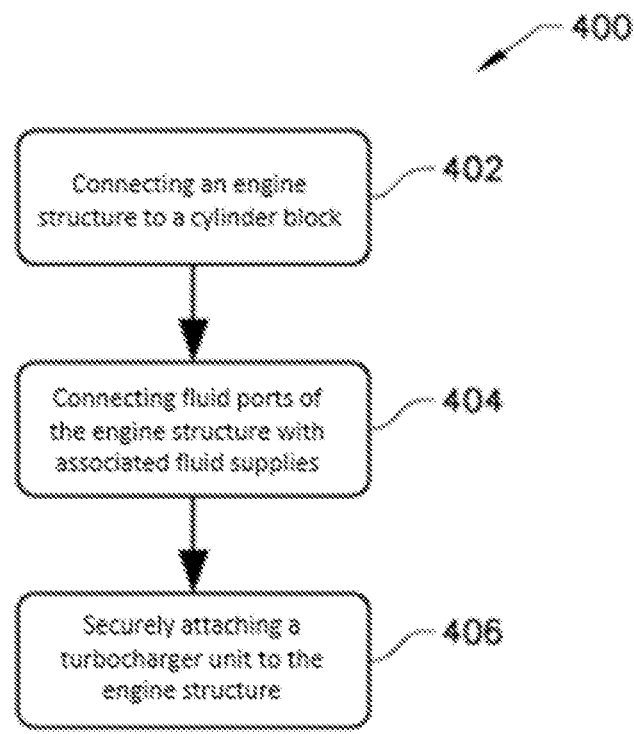
FIG. 16a
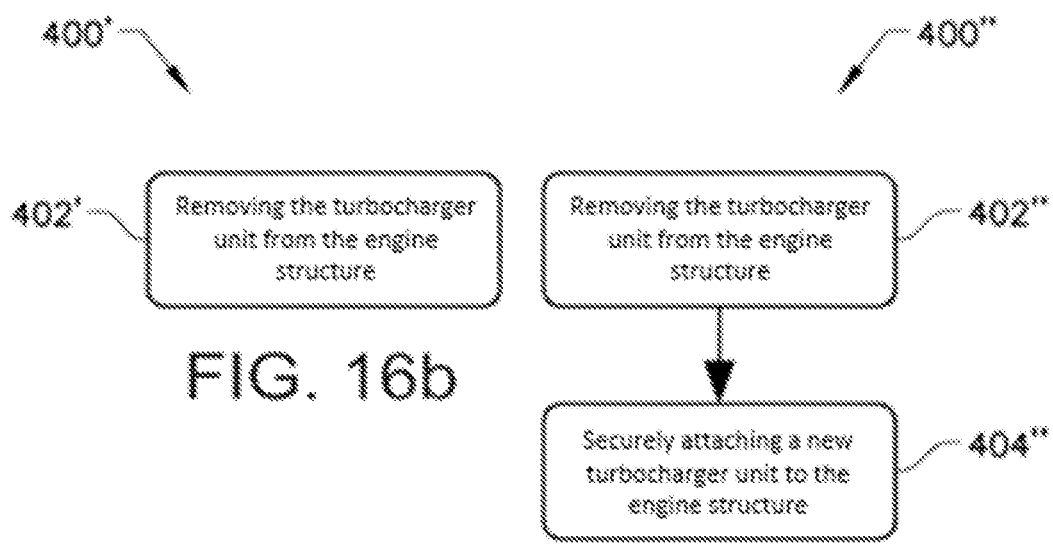
FIG. 16b
FIG. 16c

TURBOCHARGER UNIT

BACKGROUND AND SUMMARY

The invention relates to a turbocharger unit for an internal combustion engine. More particularly the present invention relates to a turbocharger unit configured to be attached to the internal combustion engine via an engine structure, as well as to such engine structure.

The invention can be applied in heavy-duty vehicles, such as trucks, buses and construction equipment. Although the invention will be described with respect to a truck, the invention is not restricted to this particular vehicle, but may also be used in other applications utilizing turbocharger units such as aero or marine systems.

A turbocharger unit is a vehicle component used together with an associated internal combustion engine, typically a diesel or gasoline engine. The turbocharger unit is configured to recover a part of the energy of the exhaust gas and to use that energy to compress intake air flowing into the combustion chamber of the internal combustion engine. Turbocharger units are commonly provided for increasing the efficiency and power of the internal combustion engine.

A turbocharger unit has three main components; a turbine for converting energy of the exhaust gas flow to a rotational movement of the turbine, a compressor rotationally connected to the turbine for compressing intake air, and a housing enclosing the turbine and the compressor as well as a rotating shaft, bearings, etc.

During operation the turbocharger unit is mounted to the cylinder head by connecting an exhaust gas inlet of the turbine side with a manifold of the internal combustion engine. One such example is shown in US 2003/0005694, wherein the manifold has a flange for cooperation with a corresponding flange surface of the turbocharger unit. Sleeves are extending from the manifold flange, arranged at one side of the manifold, to the opposite side of the manifold, in which sleeves fastening screws are guided for the fastening of the turbocharger unit. The solution proposed in US 2003/0005694 is taught to provide a simple and easily accessible mounting or demounting of the turbocharger unit. US2009/0184229 describes an isolation mounting apparatus for use when mounting the turbocharger via the bearing housing.

However, the turbocharger unit must not only receive exhaust gas flow from the internal combustion engine in order to operate, but fluid connections are also necessary for providing lubrication, and in some cases also cooling, of the rotating parts within the turbocharger unit. For this the housing of the turbocharger unit has one or more fluid ports which must be connected to corresponding ports of the internal combustion engine. Since US 2003/0005694 and US2009/0184229 are completely silent of how to solve this, there is a need for an improved turbocharger unit, as well as an improved engine structure, with respect to mounting and demounting of the turbocharger unit.

It is desirable to provide a turbocharger unit overcoming the above mentioned drawbacks of prior art units. It is also desirable to provide an engine structure for cooperation with a turbocharger unit.

An engine structure forming an adapter for connecting a turbocharger unit to a cylinder block of an internal combustion engine is provided. The engine structure comprises a set of attachment means for fastening the engine structure to the cylinder block via the engine structure such that the engine structure is positioned in between the turbocharger unit and the cylinder block. The engine structure comprises at least one fluid channel extending in a bent manner, or curvilinear, from a first surface of the engine structure to a second surface of the engine structure.

According to an embodiment the first surface is configured to bear on the cylinder block, and/or the second surface is configured to bear on the turbocharger unit.

According to an embodiment the first surface is arranged in a first plane, the second surface is arranged in a second plane, wherein the first plane is parallel with the second plane.

According to an embodiment the engine structure comprises at least one fluid channel extending in a bent manner from a first surface of the engine structure to a second surface of the engine structure, wherein the second surface is configured to bear on the turbocharger unit or on the cylinder block, and the first surface is distinct from a surface configured to bear on the turbocharger unit and from a surface configured to bear on the turbocharger unit.

According to an embodiment the set of attachment means comprises at least one bore for engagement with a fastener, and extending from a surface of the engine structure, and wherein the bore is either a through-hole for allowing the fastener to engage with a corresponding bore of the cylinder block or the turbocharger unit, or a threaded bore for allowing the fastener to either secure the turbocharger unit to the engine structure, or to secure the engine structure to the cylinder block.

An engine structure forming an adapter for connecting a turbocharger unit to a cylinder block of an internal combustion engine is also provided. The engine structure comprises a set of attachment means for securely attaching a bearing housing of the turbocharger unit to the cylinder block via the engine structure such that the engine structure is positioned in between the turbocharger unit and the cylinder block and such that at least one fluid inlet and/or a fluid outlet of the engine structure, forming part of a fluid channel extending in a bent manner from a first surface of the engine structure to a second surface of the engine structure, is aligned with a corresponding fluid inlet and/or fluid outlet of the bearing housing or of the cylinder block.

According to an embodiment the first surface is configured to bear on the cylinder block, and/or the second surface is configured to bear on the turbocharger unit.

According to an embodiment the first surface is arranged in a first plane, the second surface is arranged in a second plane, wherein the first plane is parallel with the second plane.

According to an embodiment the engine structure comprises at least one fluid channel extending in a bent manner, or curvilinear, from a first surface of the engine structure to a second surface of the engine structure, wherein the second surface is configured to bear on the turbocharger unit, and the first surface is distinct from a surface configured to bear on the turbocharger unit.

According to an embodiment the engine structure is integrally formed with a bearing housing of the turbocharger unit. According to another embodiment the engine structure (200) is integrally formed with the cylinder block.

According to an embodiment the engine structure is releasably connectable to the turbocharger unit as well as to the cylinder block.

According to an embodiment the engine structure further comprises a set of attachment means for securely attaching the engine structure to the cylinder block.

According to an embodiment the set of attachment means for attaching the turbocharger unit to the cylinder block via the engine structure comprises at least one bore for engagement with a fastener and extending from a surface of the engine structure such that the bore is accessible when the engine structure is fastened to the cylinder block.

According to an embodiment the at least one fluid channel comprises a coolant outlet and/or a lubricant outlet for alignment with a corresponding coolant inlet and a lubricant inlet of the bearing housing, and/or a coolant inlet and/or a lubricant inlet for alignment with a corresponding coolant outlet and a lubricant outlet of the bearing housing.

According to an embodiment the at least one fluid channel comprises a coolant outlet and/or a lubricant outlet for alignment with a corresponding coolant inlet and a lubricant inlet of the cylinder block, and/or a coolant inlet and/or a lubricant inlet for alignment with a corresponding coolant outlet and a lubricant outlet of the cylinder block.

According to an embodiment the at least one fluid outlet, and/or fluid inlet, comprises a pipe extending out from the engine structure.

According to an embodiment the at least one fluid inlet or fluid outlet comprises a dam.

According to an embodiment the second surface configured to bear on the turbocharger unit is provided with divider means for preventing coolant fluid to mix with lubricating fluid during disassembly of the turbocharger unit from the engine structure.

According to an embodiment the divider means is provided as a protrusive ridge extending from an upper part of the surface to a lower part of the surface, whereby the lubricant ports are arranged on one lateral side of the divider, while the coolant ports are arranged on the other lateral side of the divider.

According to an embodiment the divider means is formed by providing the second surface with a V-shaped profile such that the thickness of the engine structure is largest at a specific line, and whereby the lubricant ports are arranged on one lateral side of the specific line, while the coolant ports are arranged on the other lateral side of the specific line.

According to an embodiment the first surface configured to bear on the cylinder block is provided with divider means for preventing coolant fluid to mix with lubricating fluid during disassembly of the turbocharger unit from the cylinder block.

According to an embodiment the divider means is provided as a protrusive ridge extending from an upper part of the surface to a lower part of the surface, whereby the lubricant ports are arranged on one lateral side of the divider, while the coolant ports are arranged on the other lateral side of the divider.

According to an embodiment the divider means is formed by providing the first surface with a V-shaped profile such that the thickness of the engine structure is largest at a specific line, and whereby the lubricant ports are arranged on one lateral side of the specific line, while the coolant ports are arranged on the other lateral side of the specific line.

According to an embodiment the engine structure further comprises an additional fluid channel having a lubricant inlet and/or a coolant inlet such that the additional fluid channel forms a coolant channel from a coolant supply to the turbocharger unit, and/or a lubricant channel from a lubricant supply to the turbocharger unit.

According to an embodiment the coolant inlet forms an open connection between a coolant outlet of the cylinder block and the engine structure.

According to an embodiment the coolant inlet is closed such that it forms a shut off connection between a coolant outlet of the cylinder block and the engine structure.

According to an embodiment the lubricant inlet forms an open connection between a lubricant outlet of the cylinder block and the engine structure.

According to an embodiment the lubricant inlet is closed such that it forms a shut off connection between a lubricant outlet of the cylinder block and the engine structure.

According to an embodiment the set of attachment means for connecting the turbocharger unit to the cylinder block via the engine structure further comprises at least one guiding pin or recess for mating engagement with a corresponding guiding recess or pin of the bearing housing and/or of the cylinder block.

According to an embodiment the set of attachment means for securely attaching the engine structure to the cylinder block further comprises at least one guiding pin or recess for mating engagement with a corresponding guiding recess or pin of the cylinder block.

According to an embodiment the bearing housing, when attached to the engine structure, covers the set of attachment means for securely attaching the engine structure to the cylinder block.

According to an embodiment the bearing housing, when attached to the engine structure, does not cover the set of attachment means for securely attaching the engine structure to the cylinder block.

According to an embodiment the engine structure further comprises a support onto which the bearing housing may rest during mounting.

According to an embodiment the engine structure further comprises an actuator being releasably attached to the engine structure.

According to an embodiment the actuator is configured to receive coolant directly from the engine structure or from an associated bearing housing, and to return coolant directly to the engine structure or to the associated bearing housing.

According to an embodiment the actuator is provided with a plug for draining fluid from the actuator.

According to an embodiment the engine structure is configured to provide electrical connection between the cylinder block and the turbocharger unit.

According to an embodiment the set of attachment means for connecting the turbocharger unit to the cylinder block via the engine structure comprises at least one through hole which extends to a back side of the engine structure facing the cylinder block, and wherein the engine structure comprises a depression at least partly surrounding the through hole.

According to an embodiment the set of attachment means for connecting the turbocharger unit to the cylinder block via the engine structure comprises at least one through hole which extends to a front side of the engine structure facing the turbocharger unit, and wherein the engine structure comprises a depression at least partly surrounding the through hole.

According to an embodiment the set of attachment means for securely attaching the engine structure to the cylinder block comprises at least one through hole which extends to a back side of the engine structure facing the cylinder block, and wherein the engine structure comprises a depression at least partly surrounding the through hole.

According to an embodiment the at least one depression extends from an outer portion of the engine structure towards the through hole, such that a support face is formed between the through hole and the depression.

According to an embodiment the depression surrounds the through hole.

According to an embodiment the depression partly surrounds the through hole, and the depression is dimensioned to be aligned with a corresponding depression of a surface contacting the surface of the engine structure, such that the depression of the engine structure and the depression of the contacting surface forms a joint depression surrounding the entire through hole.

A turbocharger unit is also provided, comprising a bearing housing having means for fastening the turbocharger unit to an engine structure attached to a cylinder block of an internal combustion engine via an engine structure as described above.

According to one embodiment, the engine structure is integrally formed with the bearing housing.

A turbocharger unit is also provided, comprising a bearing housing having means for fastening the turbocharger unit to a cylinder block of an internal combustion engine via an engine structure as described above. The bearing housing comprises at least one drain plug for draining coolant fluid from the bearing housing and from the engine structure.

According to an embodiment the drain plug is in fluid communication with a coolant jacket of the bearing housing.

According to an embodiment the coolant jacket has two fluid ports, for allowing coolant fluid to enter and exit the coolant jacket, wherein at least one of the fluid ports is provided on an end face of the bearing housing facing the engine structure.

According to an embodiment the coolant jacket has two fluid ports for allowing coolant fluid to enter and exit the coolant jacket, wherein each one of the fluid ports is provided on an end face of the bearing housing facing the engine structure.

According to an embodiment the bearing housing is further provided with at least one lubrication fluid port arranged vertically below at least one of the coolant fluid ports.

According to an embodiment the bearing housing comprises at least one fluid port for alignment with a corresponding fluid port of the engine structure, and wherein the fluid port of the bearing housing is configured to seal against a pipe extending out from the fluid port of the engine structure.

According to an embodiment the bearing housing comprises an additional fluid port for alignment with a corresponding fluid port of the engine structure, and wherein the fluid port of the bearing housing is configured to seal against a pipe extending out from the fluid port of the engine structure.

According to an embodiment at least one of the fluid ports of the bearing housing is provided with an O-ring forming a sealing means.

According to an embodiment at least one of the fluid ports of the bearing housing is provided with tight fit configuration forming a sealing means.

According to an embodiment the means for fastening the turbocharger unit to a cylinder block of an internal combustion engine via the engine structure comprises at least one through hole which extends to a back side of the bearing housing facing the engine structure, and wherein the bearing housing comprises a depression at least partly surrounding one through hole.

According to an embodiment the at least one depression extends from an outer portion of the bearing housing towards the through hole such that a support face is formed between the through hole and the depression.

According to an embodiment the depression surrounds the through hole.

According to an embodiment the depression partly surrounds the through hole, wherein the depression is dimensioned to be aligned with a corresponding depression of a surface contacting the surface of the turbocharger unit, such that the depression of the turbocharger unit and the depression of the contacting surface forms a joint depression surrounding the entire through hole.

A turbocharger unit is also provided, comprising a bearing housing having means for fastening the turbocharger unit to a cylinder block of an internal combustion engine via an engine structure as described above. The bearing housing comprises at least one fluid port for alignment with a corresponding fluid port of the engine structure, wherein the fluid port of the bearing housing is configured to seal against a pipe extending out from the fluid port of the engine structure.

According to an embodiment the bearing housing comprises an additional fluid port for alignment with a corresponding fluid port of the engine structure, wherein the fluid port of the bearing housing is configured to seal against a pipe extending out from the fluid port of the engine structure.

According to an embodiment at least one of the fluid ports of the bearing housing is provided with an O-ring forming a sealing means.

According to an embodiment at least one of the fluid ports of the bearing housing is provided with tight fit configuration forming a sealing means.

According to an embodiment the means for fastening the turbocharger unit to a cylinder block of an internal combustion engine via the engine structure comprises at least one through hole which extends to a back side of the bearing housing facing the engine structure, and wherein the bearing housing comprises a depression at least partly surrounding one through hole.

According to an embodiment the at least one depression extends from an outer portion of the bearing housing towards the through hole such that a support face is formed between the through hole and the depression.

According to an embodiment the depression surrounds the through hole.

According to an embodiment the depression partly surrounds the through hole, wherein the depression is dimensioned to be aligned with a corresponding depression of a surface contacting the surface of the turbocharger unit, such that the depression of the turbocharger unit and the depression of the contacting surface forms a joint depression surrounding the entire through hole.

A turbocharger unit is also provided, comprising a bearing housing having means for fastening the turbocharger unit to a cylinder block of an internal combustion engine via an engine structure as described above. The means for fastening the turbocharger unit to the cylinder block of the internal combustion engine via the engine structure comprises at least one through hole which extends to a back side of the bearing housing facing the engine structure or the cylinder block, wherein the bearing housing comprises a depression at least partly surrounding one through hole.

According to an embodiment the at least one depression extends from an outer portion of the bearing housing towards the through hole such that a support face is formed between the through hole and the depression.

According to an embodiment the depression surrounds the through hole.

According to an embodiment the depression partly surrounds the through hole, wherein the depression is dimensioned to be aligned with a corresponding depression of a surface contacting the surface of the turbocharger unit, such that the depression of the turbocharger unit and the depression of the contacting surface forms a joint depression surrounding the entire through hole.

According to an embodiment the bearing housing is provided with divider means for preventing coolant fluid to mix with lubricating fluid during disassembly of the turbocharger unit from the cylinder block.

According to an embodiment the divider means is provided as a recessive groove extending from an upper part of the bearing housing to a lower part of bearing housing, whereby the lubricant ports are arranged on one lateral side of the divider, while the coolant ports are arranged on the other lateral side of the divider.

According to an embodiment the divider means is formed by providing the bearing housing with a V-shaped profile such that the thickness of the bearing housing is largest at a specific line, and whereby the lubricant ports are arranged on one lateral side of the specific line, while the coolant ports are arranged on the other lateral side of the specific line.

According to an embodiment the turbocharger unit further comprises an actuator being releasably attached to the bearing housing.

According to an embodiment the actuator is configured to receive coolant directly from the bearing housing or from an associated engine structure, and to return coolant directly to the bearing housing or to the associated engine structure.

According to an embodiment the actuator is provided with a drain plug.

According to an embodiment the bearing housing further comprises a lifting eye arranged at the center of the turbocharger unit.

An exhaust system for an internal combustion engine is also provided. The exhaust system comprises a turbocharger unit in accordance with any one of the aspects presented above, and an engine structure according to any one of the aspects presented above for attaching the turbocharger unit to a cylinder block of the internal combustion engine.

An internal combustion engine is also provided, comprising a cylinder block and an engine structure according to any one of the aspects presented above.

According to an embodiment the cylinder block having means for fastening the turbocharger unit to the cylinder block via an engine structure according to any one of the aspects presented above, wherein the means comprises at least one through hole which extends from a front side of the cylinder block facing the engine structure, and wherein the cylinder block comprises a depression at least partly surrounding one through hole.

According to an embodiment the at least one depression extends from an outer portion of the cylinder block towards the through hole such that a support face is formed between the through hole and the depression.

According to an embodiment the depression surrounds the through hole.

According to an embodiment the depression partly surrounds the through hole, wherein the depression is dimensioned to be aligned with a corresponding depression of a surface contacting the surface of the cylinder block, such that the depression of the cylinder block and the depression of the contacting surface forms a joint depression surrounding the entire through hole.

According to an embodiment the engine structure is formed integrally with the cylinder block.

A vehicle is also provided, comprising an internal combustion engine according to any one of the aspects presented above.

A method for attaching a turbocharger unit to a cylinder block is also provided, comprising the steps of attaching an engine structure to the cylinder block, providing at least one gasket, or O-ring, between the engine structure and the bearing housing and/or between the engine structure and the cylinder block, and securely attaching a bearing housing of the turbocharger unit to the engine structure, whereby the bearing housing forms part of means for securely attaching the turbocharger unit to the engine structure such that at least one fluid inlet and/or fluid outlet of the bearing housing is aligned with a corresponding fluid outlet and/or fluid inlet of the engine structure, wherein the at least one fluid inlet and/or fluid outlet forms part of a fluid channel extending in a bent manner in the engine structure.

A method for removing a turbocharger unit from a cylinder block is also provided. The turbocharger unit comprises a bearing housing being attached to an engine structure and sealed by means of at least one gasket, or O-ring, between the engine structure and the bearing housing, and/or between the engine structure and the cylinder block, such that at least one fluid outlet and/or fluid inlet of the engine structure is aligned with a corresponding fluid inlet and/or fluid outlet of the bearing housing, wherein the at least one fluid inlet and/or fluid outlet forms part of a fluid channel extending in a bent manner in the engine structure. The method comprises the step of removing the turbocharger unit from the engine structure without removing the engine structure from the cylinder block.

A method for replacing a turbocharger unit is also provided. The method comprises the step of removing a turbocharger unit according to aspect presented above, and the step of securely attaching a bearing housing of the turbocharger unit to the engine structure, whereby the bearing housing forms part of means for securely attaching the turbocharger unit to the engine structure such that at least one fluid inlet and/or fluid outlet of the bearing housing is aligned with a corresponding fluid outlet and/or fluid inlet of the engine structure.

Additional aspects of an engine structure, a turbocharger unit, an exhaust system, an internal combustion engine, and methods for attaching, removing, and replacing a turbocharger unit are presented below.

BRIEF DESCRIPTION OF THE DRAWINGS

With reference to the appended drawings, below follows a more detailed description of embodiments of the invention cited as examples.

In the drawings:

FIG. 11 is a cross-sectional view of the configuration shown in FIG. 10a;

FIG. 12 is a different cross-sectional view of the configuration shown in FIG. 10a;

FIG. 14b is an isometric view of an engine structure according to another embodiment;

FIG. 15 is an exploded and cross-sectional view of an engine structure according to the embodiment shown in FIG. 14a; and FIGS. 16a-c are schematic views of methods according to embodiments.

DETAILED DESCRIPTION

Figure 1:
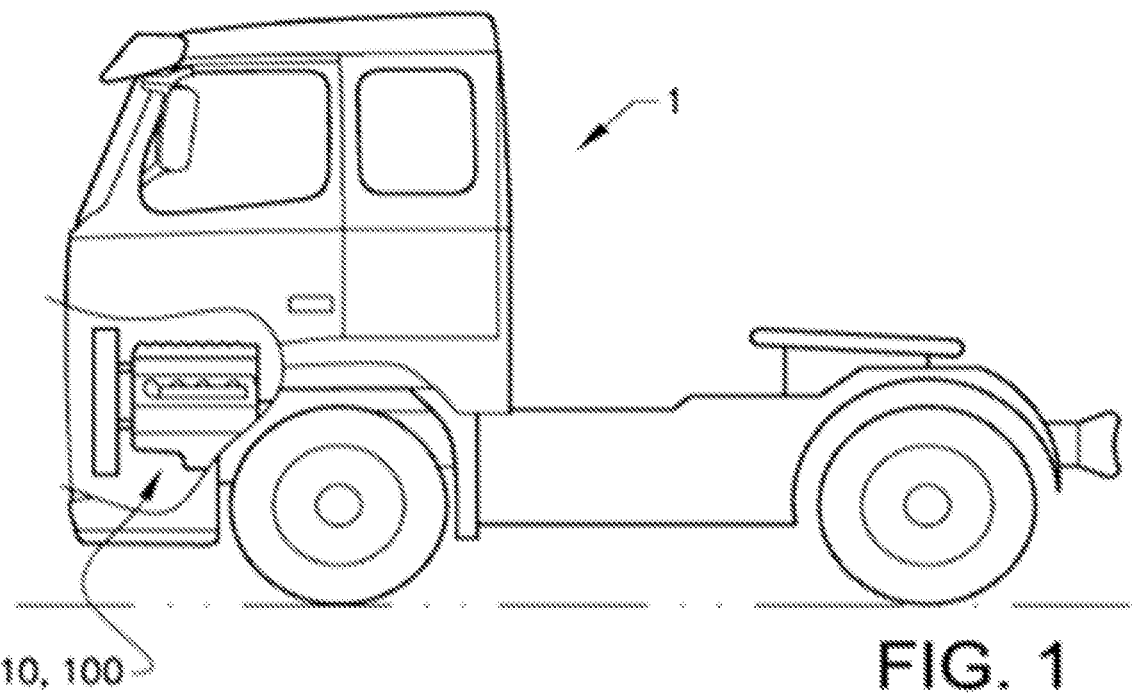
FIG. 1 is a side view of a vehicle according to an embodiment.

Starting with FIG. 1 a vehicle 1 is shown. The vehicle 1, which is illustrated as a truck, has an internal combustion engine 10 for driving the vehicle 1. As will be further explained below the internal combustion engine 10 of the vehicle 1 is provided with a turbocharger unit 100 according to various embodiments. The vehicle 1 may have additional propulsion units, such as electric drives etc. as long as it has at least one engine providing a flow of exhaust gases interacting with the turbocharger unit 100. Hence the vehicle 1 is not exclusively a truck but may also represent various vehicles such as buses, constructional equipment, etc.

Figure 2:
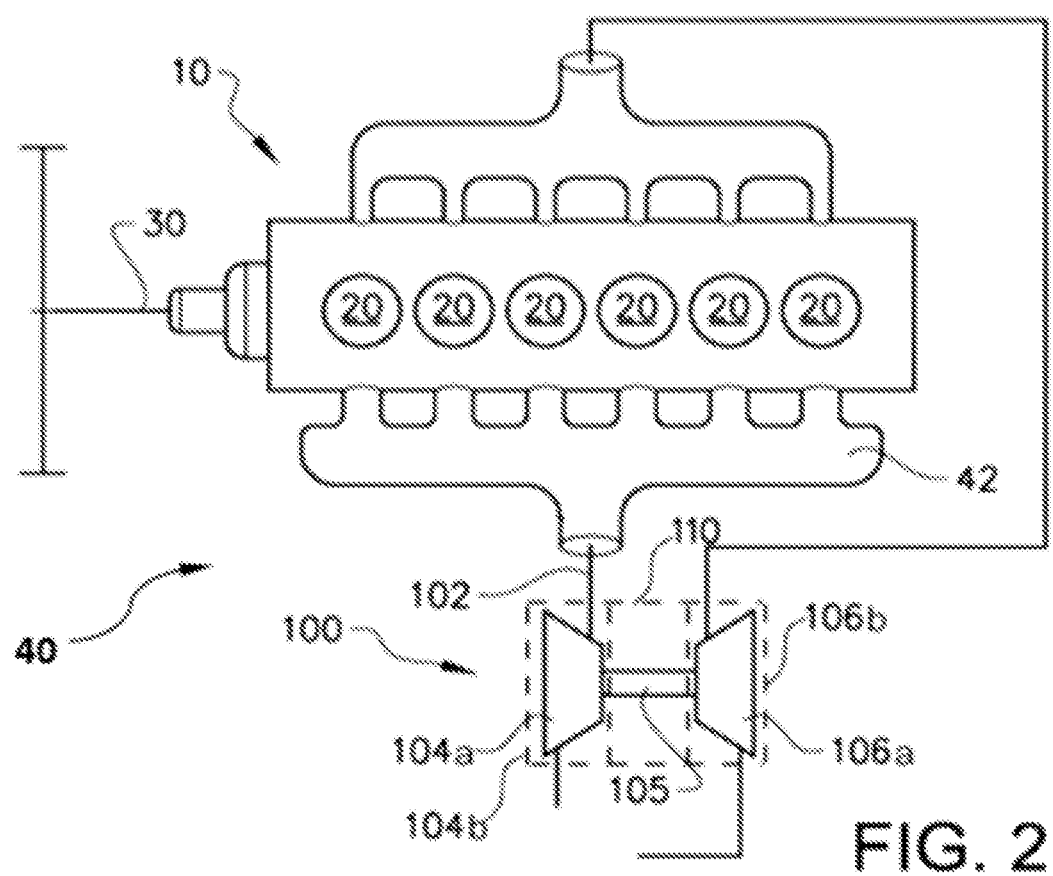
FIG. 2 is a schematic view of an internal combustion engine according to an embodiment.

In FIG. 2 an example of an internal combustion engine 10 is shown. The internal combustion engine 10 includes a plurality of cylinders 20 operated to combust fuel, such as diesel or gasoline, whereby the motion of pistons reciprocating in the cylinders 20 is transmitted to a rotation movement of a crank shaft 30. The crank shaft 30 is further coupled to a transmission (not shown) for providing a torque to driving elements (not shown). In case of a heavy vehicle, such as a truck, the driving elements are wheels; however, the internal combustion engine 10 may also be used for other equipment such as construction equipment, marine applications, etc.

The internal combustion engine 10 further comprises an exhaust gas system 40, which system 40 serves the purpose of recovering at least some of the energy in the exhaust gas flow to improve the performance of the internal combustion engine 10. In the shown example the exhaust gas exits the cylinders 20 and enters an exhaust manifold 42 which is further connected to an exhaust inlet 102 of a turbocharger unit 100. The exhaust gas flow causes a turbine 104a arranged inside a turbine housing 104b to rotate, which rotation is translated via a shaft 105 to a corresponding rotation of a compressor 106a arranged inside a compressor housing 106b and being used to compress incoming air before it is introduced in the cylinders 20. The basic structural as well as functional specifications of a turbocharger unit 100 are well known in the art and will not be described in full details.

Figure 3:
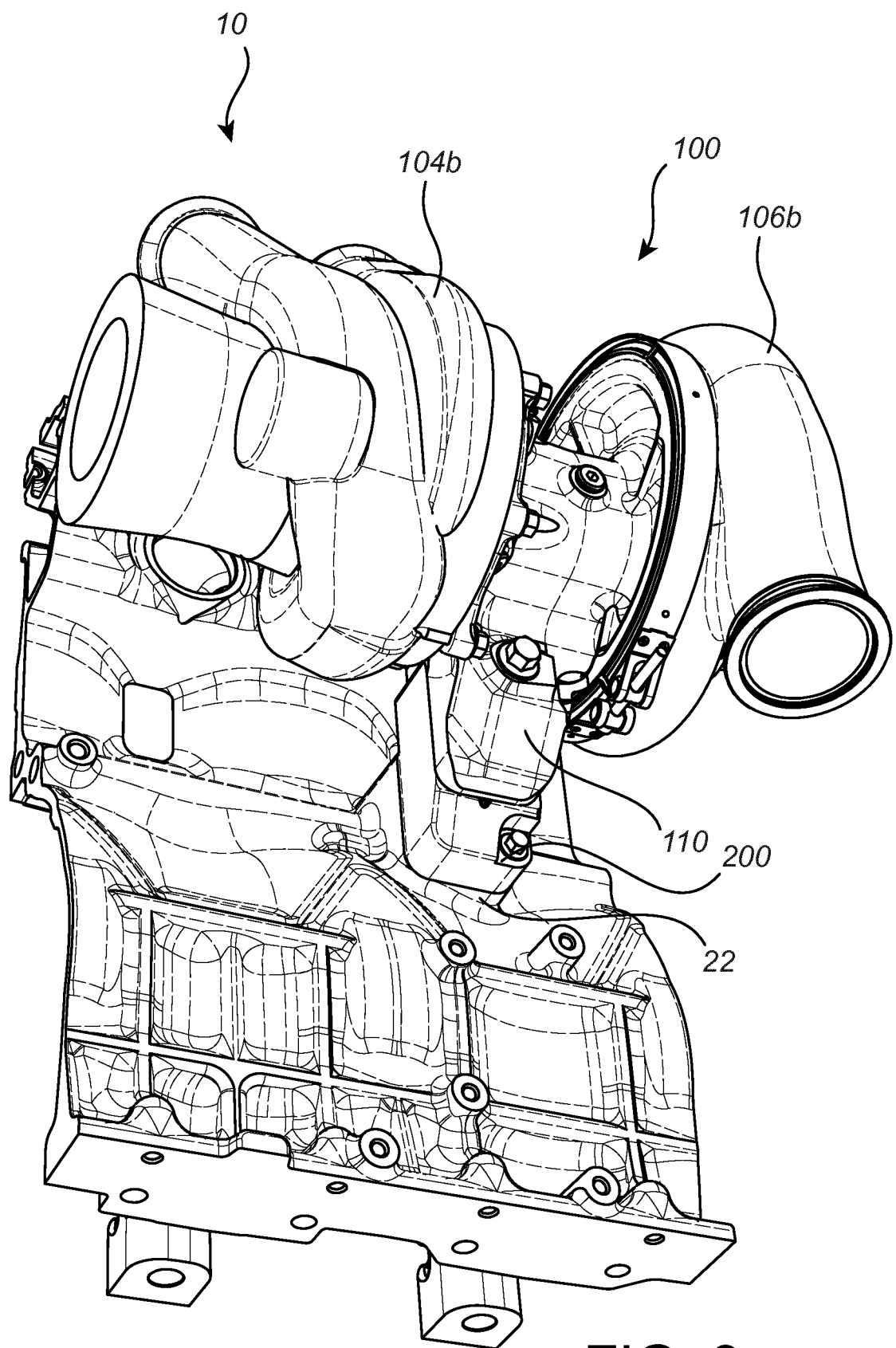
FIG. 3 is an isometric view of a turbocharger unit being attached to a cylinder block via an engine structure according to an embodiment.

Now turning to FIG. 3 an embodiment of a turbocharger unit 100 is shown. The turbocharger unit 100 is attached to a cylinder block 22 of an internal combustion engine 10 via an engine structure 200. The turbocharger unit 100 comprises a turbine arranged inside a turbine housing 104b, a compressor arranged inside a compressor housing 106b, and a shaft (not shown) connecting the compressor with the turbine such that rotation of the turbine causes a corresponding rotation of the compressor. A bearing housing 110, preferably being integrally formed, is provided between the turbine housing 104b and the compressor housing 106b. The bearing housing 110, the turbine, the shaft, and the compressor forms a centre housing rotating assembly which is connected at opposite axial ends to the turbine housing 104b and to the compressor housing 106b. The turbocharger unit 100 further comprises an exhaust inlet at the turbine housing 104b as well as an air inlet at the compressor housing 106b. The bearing housing 110 further forms a support for bearings, in order to allow the shaft to rotate with a minimum of friction and vibration.

As can be seen in FIG. 3 the turbocharger unit 100 is connected to the internal combustion engine 10 by means of the engine structure 200. The engine structure 200 forms an adapter, i.e. an interface between the bearing housing 110 of the turbocharger unit 100 and the cylinder block 22 of the internal combustion engine 10. In addition to this the exhaust inlet of the turbocharger unit 100 is connected to an exhaust outlet (not shown) of a manifold, e.g. by means of flexible joints such as bellows, lipseal, etc.

Figure 4A:
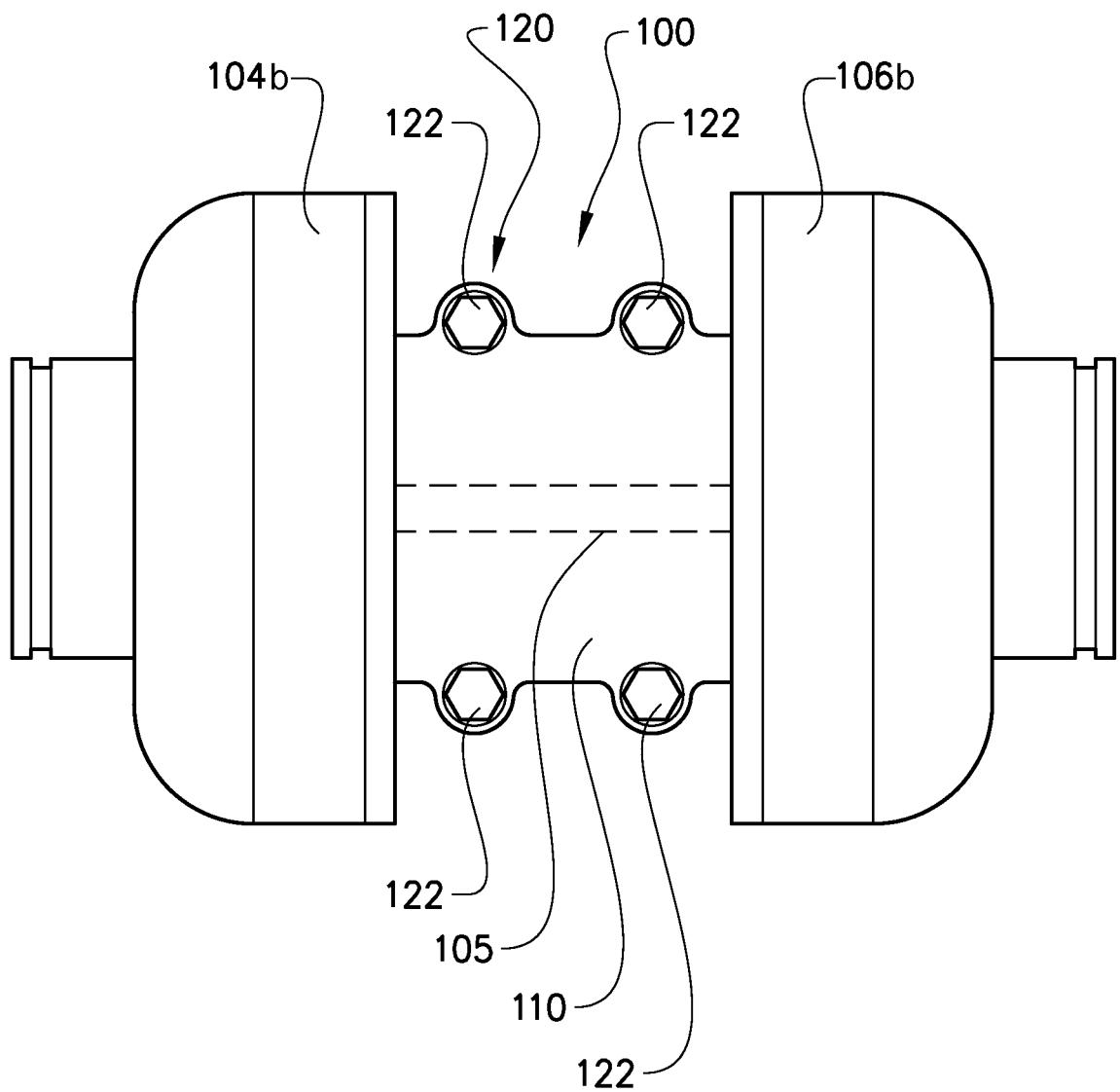
FIGS. 4a-b are front views of a turbocharger unit according to different embodiments.
Figure 4B:
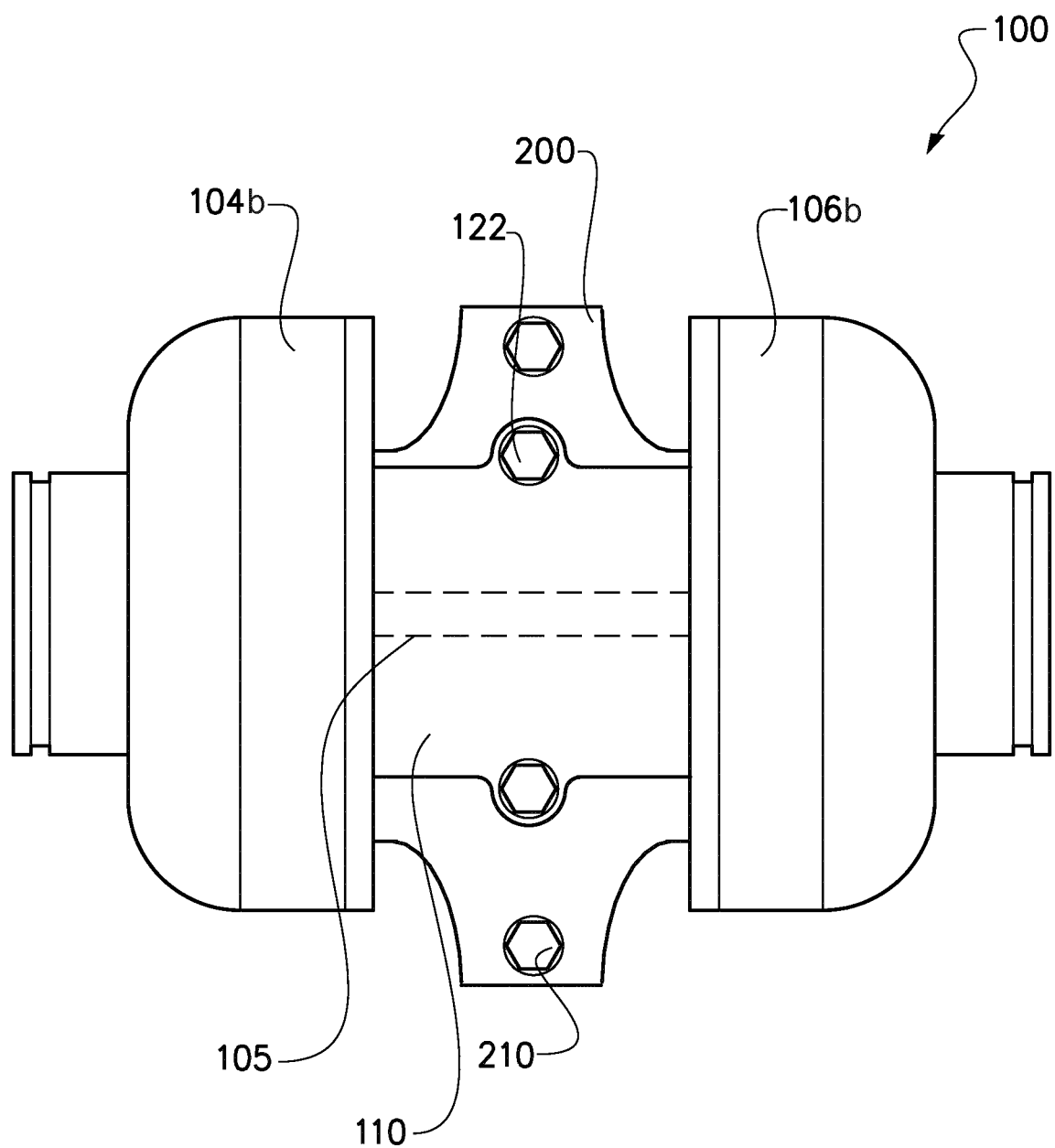

Now turning to FIGS. 4a-b schematic views of a turbocharger unit 100 is shown, comprising a bearing housing 110 enclosing the turbine shaft 105, as well as the turbine housing 104b enclosing the turbine 104a and the compressor housing 106b enclosing the compressor 106a. The turbocharger unit 100 further comprises fastening means 120 provided for fastening the turbocharger unit 100 to the engine structure 200 (see FIG. 3) and to the cylinder block 22. As can be seen in FIG. 4a the fastening means 120 comprises a plurality of openings 122 in the bearing housing 110 for receipt of fasteners, such as screws, bolts, or studs. Preferably the openings 122 extend in a transverse direction in relation to an axial direction of the shaft 105 and towards the engine structure 200. With reference to the embodiment of FIG. 4a showing four openings 122, all openings 122 are positioned axially between the turbine housing 104b and the compressor housing 106b and on opposite sides of the shaft 105, preferably being arranged close to equal distance from the upper openings and the lower openings shown in FIG. 4a. The openings 122 extend in parallel and form through holes in the bearing housing 110. Hence, the openings 122 has a first end on a first side of the bearing housing 110, which first side is configured to face the engine structure 200, and a second end on a second side of the bearing housing 110, which second side is on an opposite side of the bearing housing 110 in relation to the first side. The turbocharger unit 100 may thus be attached to the cylinder block 22 via the premounted engine structure 200 by using fasteners, such as screws, studs, bolts, etc received in the openings 122.

FIG. 4b shows a further embodiment of a turbocharger unit 100, wherein the fastening means 120 comprises two openings 122 being arranged on opposite sides of the shaft 105 extending axially inside the bearing housing 110. The two openings 122 are provided for attaching the bearing housing 110 to the engine structure 200. Openings 210 are provided for attaching the engine structure 200 to the cylinder block 22.

Figure 5:
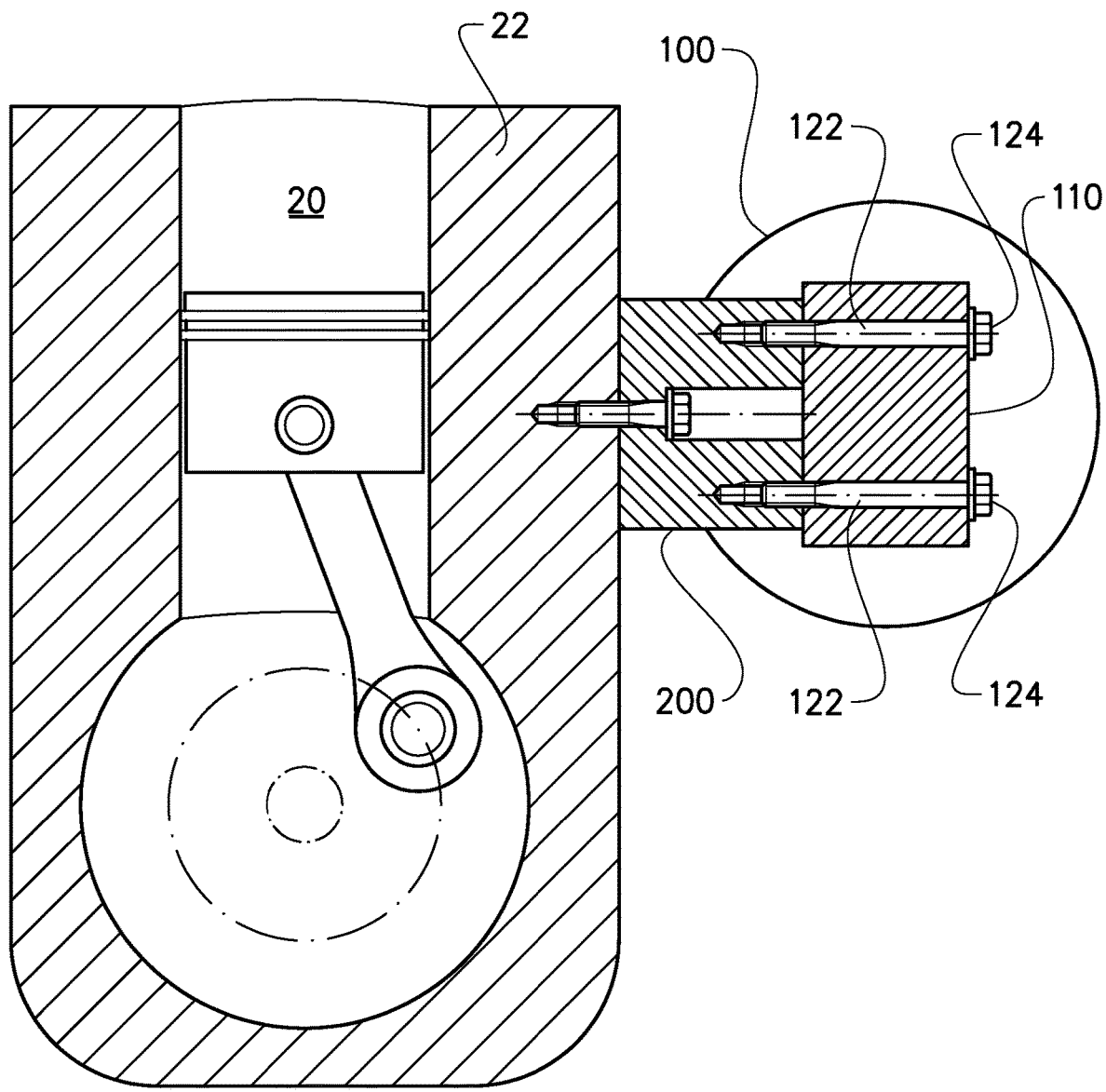
FIG. 5 is a cross-sectional view of a cylinder block and a turbocharger unit according to an embodiment.

FIG. 5 shows a cross-sectional view of a turbocharger unit 100 being attached to a cylinder block 22 of an internal combustion engine via an engine structure 200. The openings 122 are formed as through holes such that bolts 124 may be inserted into the openings 122 and further into the engine structure 200 for urging the turbocharger unit 100 towards the engine structure 200.

Figure 7A:
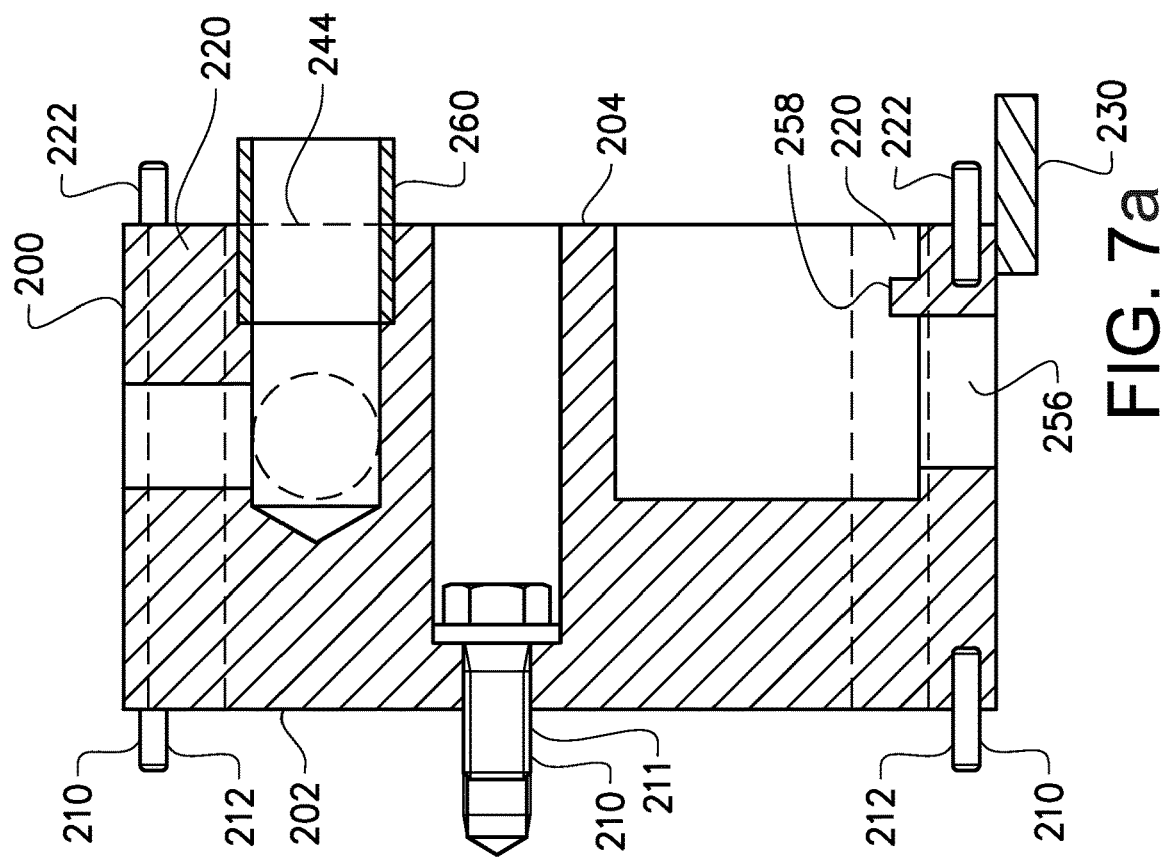
FIGS. 7a-b are side cross-sectional views of an engine structure according to different embodiments.
Figure 6:
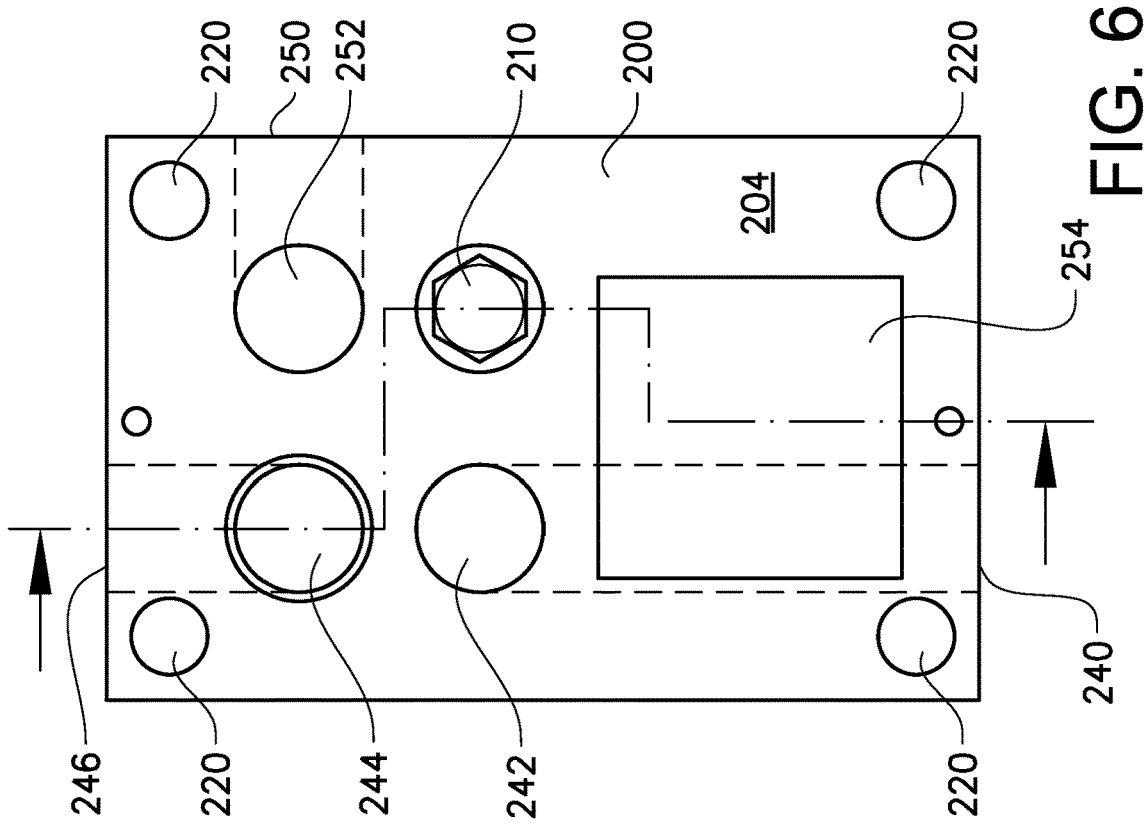
FIG. 6 is a front view of an engine structure according to an embodiment.

Now turning to FIG. 6 and FIG. 7a an embodiment of an engine structure 200 is shown. The engine structure 200 has a first side 202 to bear on the cylinder block 22 of the internal combustion engine 10, and a second side 204 opposite the first side 202 to bear on the bearing housing 110 of the turbocharger unit 100. The engine structure 200 comprises a first set of attachment means 210 for fastening the engine structure 200 to the cylinder block 22, and a second set of attachment means 220 for fastening the turbocharger unit 100 to the engine structure 200. The first attachment means 210 comprises at least one screw or bolt 211, which may be screwed into a mating recess of the cylinder block 22. In addition to this the first attachment means 210 may further comprise one or more pins or recesses 212, for engagement with corresponding recesses or pins of the cylinder block 22.

The second attachment means 220 comprises at least one bore for receiving a stud or a screw being insertable through the openings 122 of the turbocharger unit 100, such that the turbocharger unit 100 will be urged towards the engine structure 200 when tightening the stud nuts or screws. The second attachment means 220, i.e. the one or more bores for receiving studs or screws, may be through holes, as indicated in FIG. 7a such that the screws or studs are further engaging with aligned bores of the cylinder block 22 (see FIG. 5). In other embodiments the bores of the second attachment means 220 ends within the engine structure 200. Tightening may thus be allowed by providing the one or more bores with internal threads.

Further to this the second attachment means 220 may comprise one or more pins or recesses 222, for engagement with corresponding recesses or pins of the bearing housing 110 of the turbocharger unit 100. As an option, or in addition the first attachment means 210 may comprise one or more pins or recesses, for engagement with corresponding recesses or pins of the cylinder block 22.

The engine structure 200 may further comprise a support 230, extending from the lower portion of the second side 204 away from the engine structure 200. The support 230 is provided for allowing the turbocharger unit 100 to rest onto the support 230 during mounting.

FIG. 6 shows a number of fluid ports; a coolant inlet 240 is provided at the lower end of the engine structure 200 and extends to a coolant outlet 242 for alignment with a corresponding coolant inlet of the bearing housing 110 of the turbocharger unit 100. A secondary coolant inlet 244, for receiving coolant such as water flowing out from a corresponding coolant outlet of the bearing housing 110, is provided and ends at a coolant outlet 246 on an upper side of the engine structure 200. Hence, fluid for cooling the rotating parts of the turbocharger unit 100 will flow from below and upwards.

A lubricant inlet 250 is provided at the upper end of a lateral side of the engine structure 200 and extends to a lubricant outlet 252 for alignment with a corresponding lubricant inlet of the bearing housing 110 of the turbocharger unit 100. A secondary lubricant inlet 254, for receiving lubricant such as oil flowing out from a corresponding lubricant outlet of the bearing housing 110, is provided and ends at a lubricant drainage 256 on a lower side of the engine structure 200.

Hence, the engine structure 200 may be connected with fluid supplies, e.g. supplying coolant and/or lubricants, by hoses or other connections. The fluid inlets 240, 250 may be arranged on the upper side of the engine structure 200, the lower side of the engine structure 200, and/or the lateral sides of the engine structure 200.

Figure 7B:
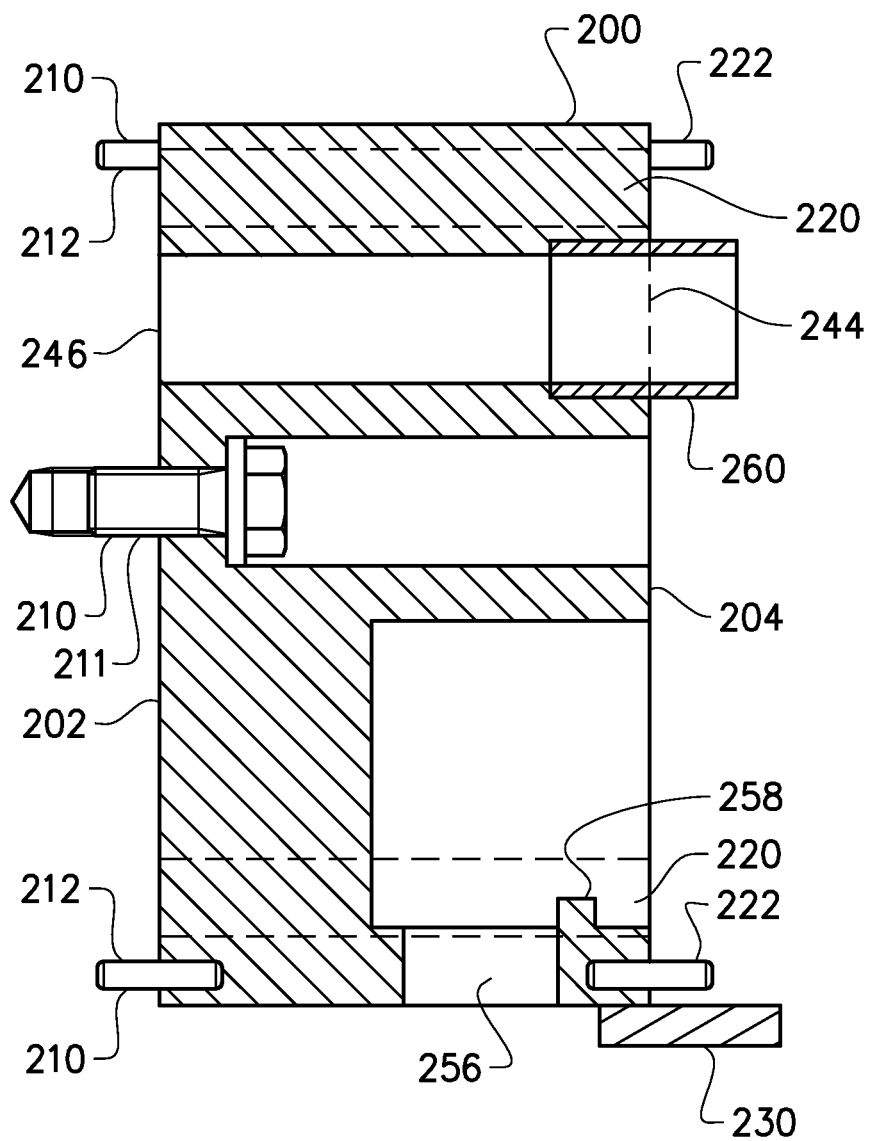

In a further embodiment, shown in FIG. 7b, the coolant inlet (not shown) and the coolant outlet 246 of the engine structure 200 are facing the cylinder block 22. Such embodiments may be particularly advantageous for cylinder blocks 22 having a lid for cooling liquid, whereby holes may be drilled in the lid at positions being aligned with the coolant inlet 240 and the coolant outlet 246. Fluid channels may also be drilled in the cylinder block 22, in case no lid is provided. The engine structure 200 may be sealed against the cylinder block 22 by means of one or more gaskets, O-rings, etc. (not shown).

Figure 10A:
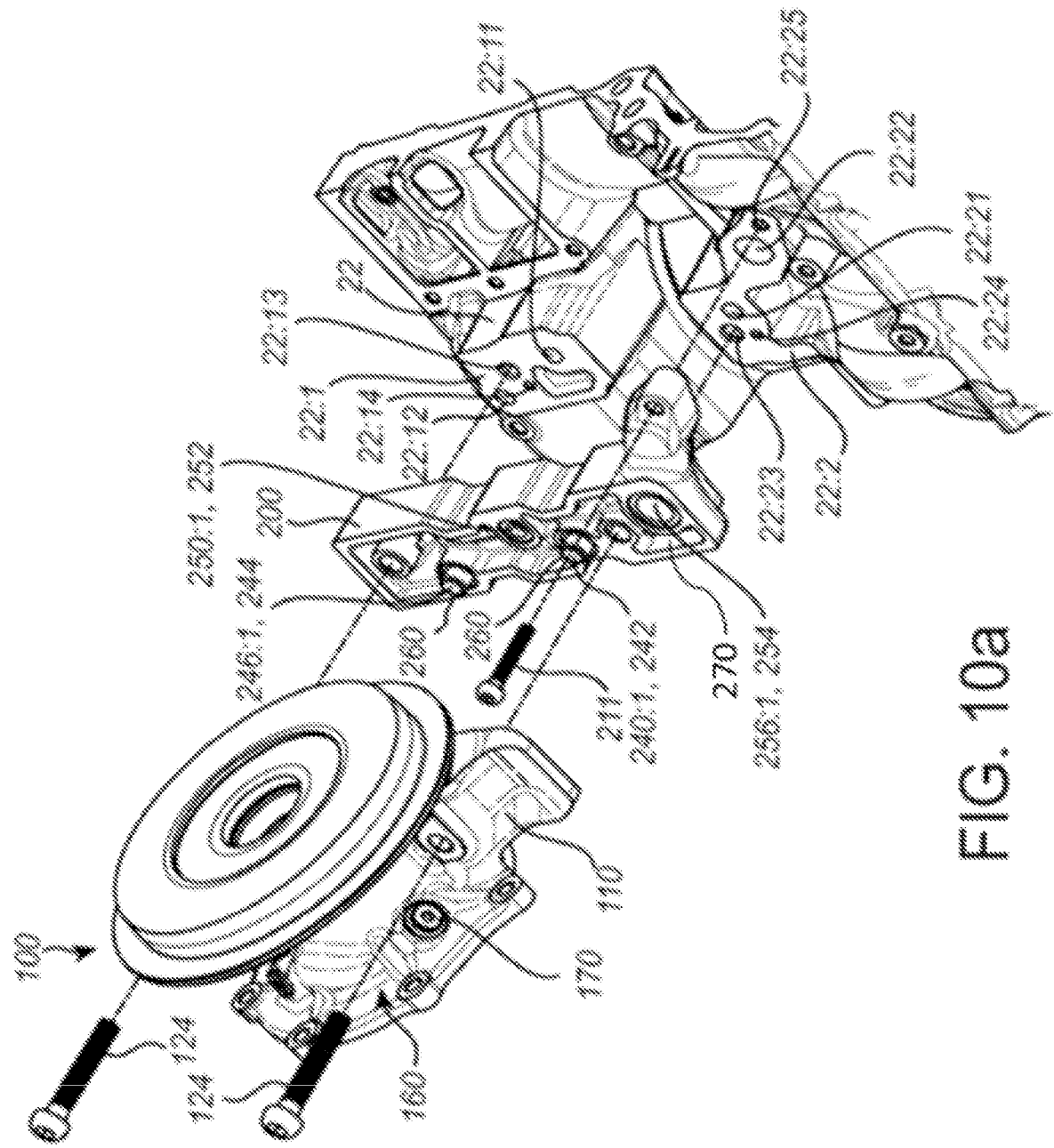
FIG. 10a is an exploded view of a turbocharger unit, an engine structure, and parts of a cylinder block according to an embodiment.

In a yet further embodiment, shown also in FIG. 10 as will be described later, the engine structure 200 is attached to the cylinder block 22 such that the lubricant inlet 250 and the lubricant drainage 256 are facing the cylinder block 22. Similarly to what has been described above with respect to the cooling and FIG. 7b, holes may be drilled in a portion of the cylinder block 22 defining a part of an oil conduit or an oil reservoir. The holes should be aligned with the lubricant inlet 250 and the lubricant drainage 256 of the engine structure 200. The engine structure 200 may be sealed against the cylinder block 22 by means of one or more gaskets, O-rings, etc. (not shown).

FIG. 7a shows a cross-sectional view of the embodiment shown in FIG. 6, taken along the dashed line. A pipe 260 is provided for preventing coolant to escape into the lubricant return during disassembly. For a similar purpose, i.e. to prevent contamination and undesired mix of fluids, a dam 258 is provided at the lubricant return, i.e. at the lubricant inlet 254, for preventing coolant to mix with the lubricant during disassembly. Various embodiments may be realized for forming a dam function. Different designs are possible depending on the positions of the lubricant ports 252, 254 in relation to the coolant ports 242, 244. For example, a divider 270 (see FIG. 10a) may be formed as a protrusive ridge extending from an upper part of surface 204 to a lower part of surface 204, whereby the lubricant ports 252, 254 are arranged on one lateral side of the divider 270, while the coolant ports 242, 244 are arranged on the other lateral side of the divider 270. In other embodiments the divider function may be provided by having a non-planar surface 204 of the engine structure 200, such that the thickness of the engine structure 200 is largest at a center line. A divider (not shown) is consequently not formed by a protrusive ridge, but instead as a V-shaped profile whereby the entire surface 204 protrudes towards its center. For the embodiments described above with respect to the divider function, a corresponding shape of the bearing housing 110 is preferred for providing a tight interface between the engine structure 200 and the bearing housing 110.

The pipe 260 may also be used as part of the second attachment means 220, whereby it provides facilitated alignment with the turbocharger unit 100. The pipe 260 will also seal during disassembly of the turbocharger unit 100. This will reduce the risk of fluid mixing. As an option, or in addition, shoulders may be provided at the engine structure for mating with corresponding structures of the cylinder block 22 and/or the bearing housing 110.

A dam function may also be provided for the interface formed between the engine structure 200 and the cylinder block 22, especially for the embodiment described with reference to FIG. 7b in order to prevent that lubricant and coolant are mixed in the engine when dismounting the engine structure 200 from the cylinder block 22. Similarly to what has been described above a divider 270 may be formed as a protrusive ridge extending from an upper part of surface 202 to a lower part of surface 202. In other embodiments the divider function may be provided by having a non-planar surface 202 of the engine structure 200, such that the thickness of the engine structure 200 is smallest at a center line. A divider (not shown) is consequently not formed by a protrusive ridge, but instead as a V-shaped profile whereby the entire mating surface to 202 of the cylinder block 22 protrudes towards its center. For the embodiments described above with respect to the divider function, the cylinder block 22 and the engine structure 200 should preferably be provided with mating structures for providing a tight interface between the engine structure 200 and the cylinder block 22.

Figure 8:
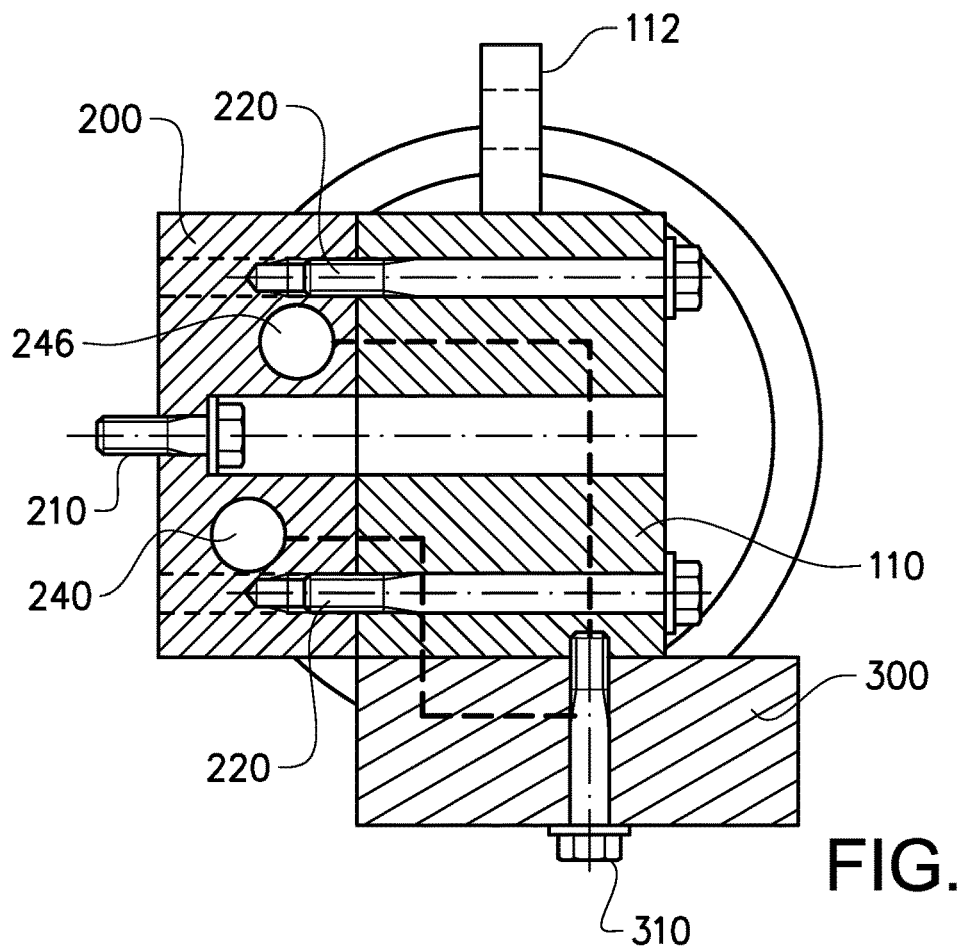
FIG. 8 is a side cross-sectional view of a turbocharger unit, having an actuator, and being attached to an engine structure according to an embodiment.

With reference to FIG. 8 a further embodiment of a turbocharger unit 100 is shown when attached to an engine structure 200. Similarly to what has been described with reference to FIGS. 4-7, the engine structure 200 is attached to the cylinder block 22 of the internal combustion engine 10, and the turbocharger unit 100 is subsequently attached to the engine structure 200. For the embodiments shown in FIG. 8 and FIG. 9, the turbocharger unit 100 is a variable geometry turbocharger unit requiring actuation of turbine housing vanes in order to change the geometry. Hence, an actuator 300 is provided. In FIG. 8 the actuator 300 is arranged below the bearing housing 110 and screwed onto the turbocharger unit 100 axially between the turbine housing 104b and the compressor housing 106b. The actuator 300 is connected to the coolant inlets and outlets of the engine structure 200 by means of associated channels within the bearing housing 110 for guiding coolant into the actuator 300. Also, a drain plug 310 may be provided for emptying the engine coolant. The bearing housing 110 is provided with a lifting eye 112 for facilitating handling of the turbocharger unit 100. This is possible due to available space on the upper side of the bearing housing 110 which in prior art systems is occupied by fluid connections. The lifting eye 112 may be a permanent structure or being provided as a screwed in eye temporarily inserted into a threaded hole of the bearing housing 110. The lifting eye 112 may also be provided as one or more structures arranged at the bearing housing 110, the turbine housing 104b, and/or the compressor housing 106b.

Figure 9:
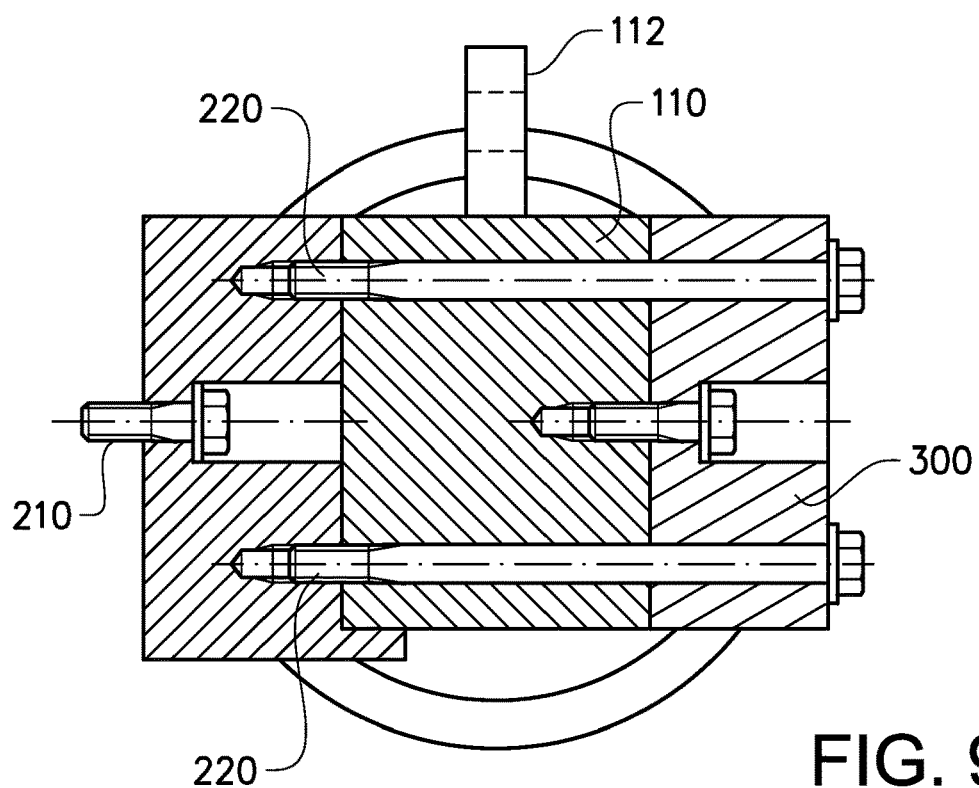
FIG. 9 is a side cross-sectional view of a turbocharger unit, having a lifting eye, and being attached to an engine structure according to another embodiment.

A yet further embodiment of an actuator 300 is shown in FIG. 9, in which the actuator 300 is arranged on an opposite side of the bearing housing 110 than the engine structure 200. Hence, the bearing housing 110 of the turbocharger unit 100 is arranged between the engine structure 200 and the actuator 300.

In further embodiments the actuator 300 may be attached to the engine structure 200, instead of the bearing housing 110. The actuator 300 may be configured to receive coolant directly from the engine structure 200.

As can be seen in FIG. 8, the second attachment means 220 for attaching the turbocharger unit 100 to the engine structure 200 may be through holes (indicated by dashed lines), whereby threaded bores may be provided in the cylinder block 22 for receiving screws or studs inserted through the openings 122 of the bearing housing 110.

As for all embodiments so far, it may be desired to arrange the first attachment means 210, i.e. the means used for securely attaching the engine structure 200 to the cylinder block 22, at a predetermined position that will be hidden once the bearing housing 110 of the turbocharger unit 100 is attached to the engine structure 200. It will consequently not be possible to access the first attachment means 210 without dismounting the turbocharger unit 100 from the engine structure 200.

In the description above different configurations of fluid ports has been discussed for providing fluid connection to the turbocharger unit 100 via the engine structure 200. In addition to this, the engine structure 200 may also provide electrical connection between the cylinder block 22, or other parts of the vehicle, and the turbocharger unit 100. Such electrical connections may e.g. include cables for transmitting signals, such as turbine speed sensor signals, actuator signals, and/or signals relating to the operation of an associated electrical waste gate. The electrical connections may also include power cables, e.g. for transmitting power to the speed sensor, the actuator, and/or the waste gate. Electrical connections may interface directly with the cylinder block 22 or via contacts arranged on the side of the engine structure 200.

An embodiment of a configuration for attaching a turbocharger unit 100 to a cylinder block 22 via an engine structure 200 is shown in FIGS. 10-15. Starting in FIG. 10a, the cylinder block 22 has two support plateaus 22:1, 22:2, each support plateau 22:1, 22:2 forming a planar support surface for the engine structure 200. The upper support plateau 22:1 has two openings 22:11, 22:12 forming a coolant inlet port 22:11 and a coolant outlet port 22:12, respectively. Hence, the two openings 22:11, 22:12 allows for coolant fluid, such as water, to flow from the cylinder block 22 to the engine structure 200, as well as from the engine structure 200 back to the cylinder block 22.

Further, the upper support plateau 22:1 has a threaded bore 22:13 for receiving a screw 124; the screw 124 being used to securely tighten the turbocharger unit 100 to the cylinder block 22 via the engine structure 200. The upper support plateau 22:1 also has at least one recess 22:14 for receiving a guiding pin 212 of the engine structure 200. Hence, as the guiding pin 212 is received by the recess 22:14 an accurate positioning of the engine structure 200 relative the upper support plateau 22:1 is achieved.

The lower support plateau 22:2 has two openings 22:21, 22:22 forming a lubricant inlet port 22:21 and a lubricant outlet port 22:22, respectively. Hence, the two openings 22:21, 22:22 allows for lubricant fluid, such as oil, to flow from the cylinder block 22 to the engine structure 200, as well as from the engine structure 200 back to the cylinder block 22.

Further, the lower support plateau 22:2 has a threaded bore 22:23 for receiving a screw 124; the screw 124 being used to securely tighten the turbocharger unit 100 to the cylinder block 22 via the engine structure 200. The lower support plateau 22:2 also has at least one recess 22:24 for receiving a guiding pin 212 of the engine structure 200. Hence, as the guiding pins 212 are received by the recesses 22:24, 22:14 an accurate positioning of the engine structure 200 relative the cylinder block 22 is achieved. The lower support plateau 22:2 also has an additional threaded bore 22:25 for receiving a screw 211 used for attaching the engine structure 200 to the cylinder block 22.

In some embodiments the guiding pins 212 may be provided as sleeves arranged around the bores for receiving the screws.

When mounting the turbocharger unit 100 to the cylinder block 22, the engine structure 200 is firstly aligned with the cylinder block 22 by positioning the engine structure 200 such that the pins 212 of the engine structure 200 are received by the recesses 22:14, 22:24 of the cylinder block 22. Thereafter the screw 211 is tightened, such that the engine structure 200 is at least to some extent fixated to the cylinder block 22. At this stage, the fluid ports 22:11, 22:12, 22:21, 22:22 of the cylinder block 22 are aligned with corresponding fluid ports of the engine structure 200. The use of a connection block 200 in accordance with the description herein it is possible to bridge a non-planar surface of the cylinder block 22 to a preferably planar surface of the bearing housing 110 of the turbocharger unit 100.

Figure 13:
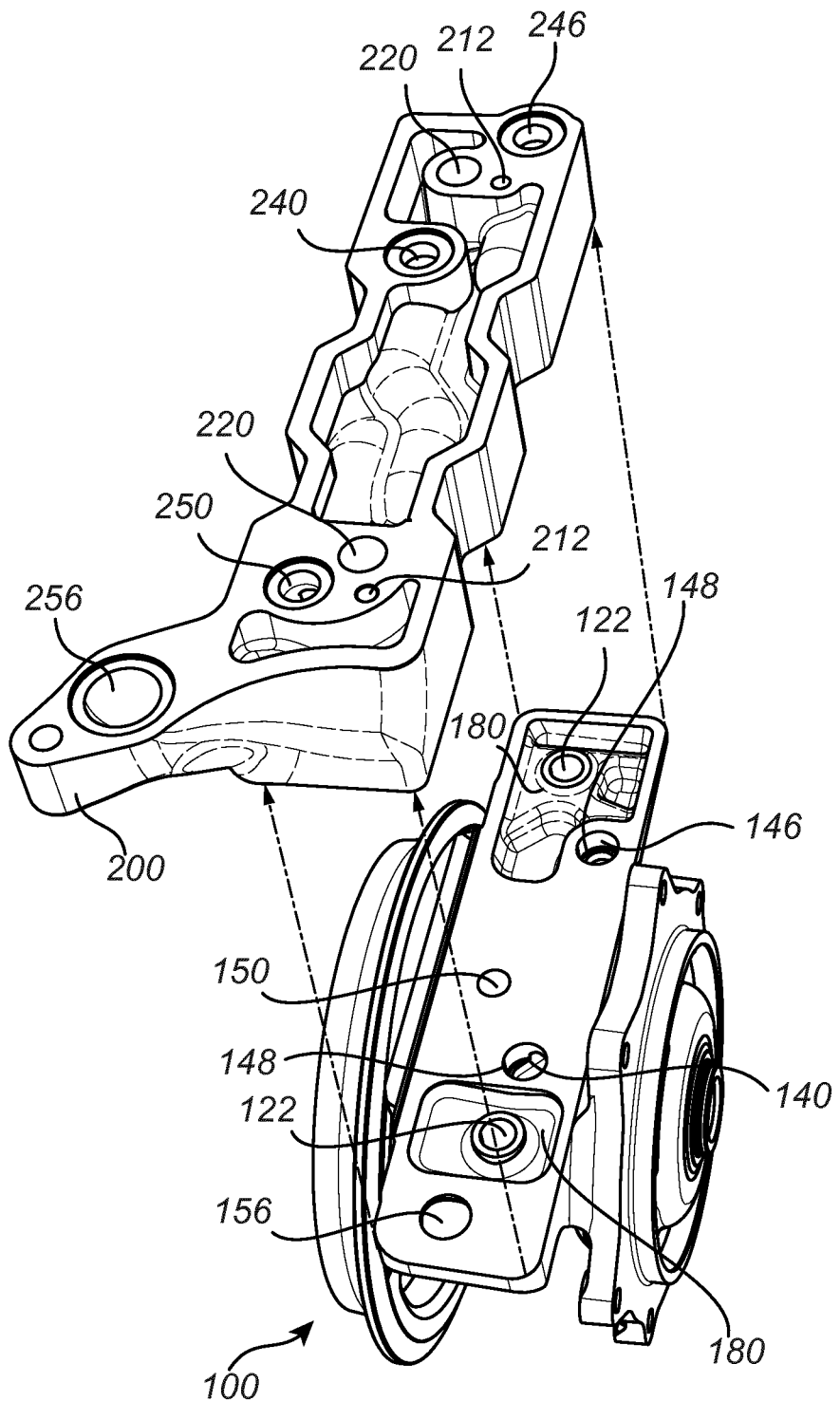
FIG. 13 is an exploded view of a turbocharger unit and an engine structure according to an embodiment.

Better shown in FIG. 13 the back side of the engine structure 200, i.e. the side facing the cylinder block 22, has a coolant inlet 240 for alignment with the coolant port 22:11 of the cylinder block 22. A coolant outlet 246 is also provided for returning coolant back to the cylinder block 22 via the coolant port 22:12.

The back side of the engine structure 200 further comprises a lubricant inlet 250 for alignment with the lubricant port 22:21 of the cylinder block 22, as well as a lubricant outlet 256 for alignment with the lubricant port 22:22 of the cylinder block 22.

The engine structure 200 also has two through-holes 220 for guiding the screws 124 into the threaded bores 22:13, 22:23 of the cylinder block 22, as well as the pins 212 as described above.

Now returning back to FIG. 10a the coolant inlet 240 forms part of a coolant fluid supply channel 240:1 extending in a bent manner, or curvilinear, inside the engine structure 200, and ending at a coolant outlet 242 at the side of the engine structure 200 facing the turbocharger unit 100. In a similar manner the coolant outlet 246 forms part of a coolant fluid return channel 246:1 extending in a bent manner, or curvilinear, inside the engine structure 200, starting at a coolant inlet 244 at the side of the engine structure 200 facing the turbocharger unit 100. The coolant fluid supply channel 240:1 thus provides coolant flow from the cylinder block 22 to the turbocharger unit 100, while the coolant fluid return channel 246:1 provides coolant flow from the turbocharger unit 100 back to the cylinder block 22.

The lubricant inlet 250 forms part of a lubricant fluid supply channel 250:1 extending in a bent manner, or curvilinear, inside the engine structure 200, and ending at a lubricant outlet 252 at the side of the engine structure 200 facing the turbocharger unit 100. In a similar manner the lubricant outlet 256 forms part of a lubricant fluid return channel 256:1 extending in a bent manner, or curvilinear, inside the engine structure 200, starting at a lubricant inlet 254 at the side of the engine structure 200 facing the turbocharger unit 100. The lubricant fluid supply channel 250:1 thus provides lubricant flow from the cylinder block 22 to the turbocharger unit 100, while the lubricant fluid return channel 256:1 provides lubricant flow from the turbocharger unit 100 back to the cylinder block 22.

The use of an engine structure 200 having fluid channels 240:1, 246:1, 250:1, 256:1 extending curvilinear, or in a bent manner, the engine structure 200 provides an extremely efficient adapter for fitting various types of turbocharger units 100 to a cylinder block 22 without using external fluid hoses. In particular, the cylinder block 22 may allow fluid ports at specific positions, while the turbocharger unit normally requires fluid ports also at predetermined positions. As the fluid ports of the turbocharger unit 100 normally does not fit with the fluid ports of the cylinder block 22 it has previously been required to arrange hoses between the turbocharger unit 100 and the cylinder block 22. However, by the provisions of the curvilinear fluid channels 240:1, 246:1, 250:1, 256:1 the engine structure 200 will in fact allow perfect alignment of the fluid ports of the turbocharger unit 100 with the fluid ports of the cylinder block 22.

Figure 10B:
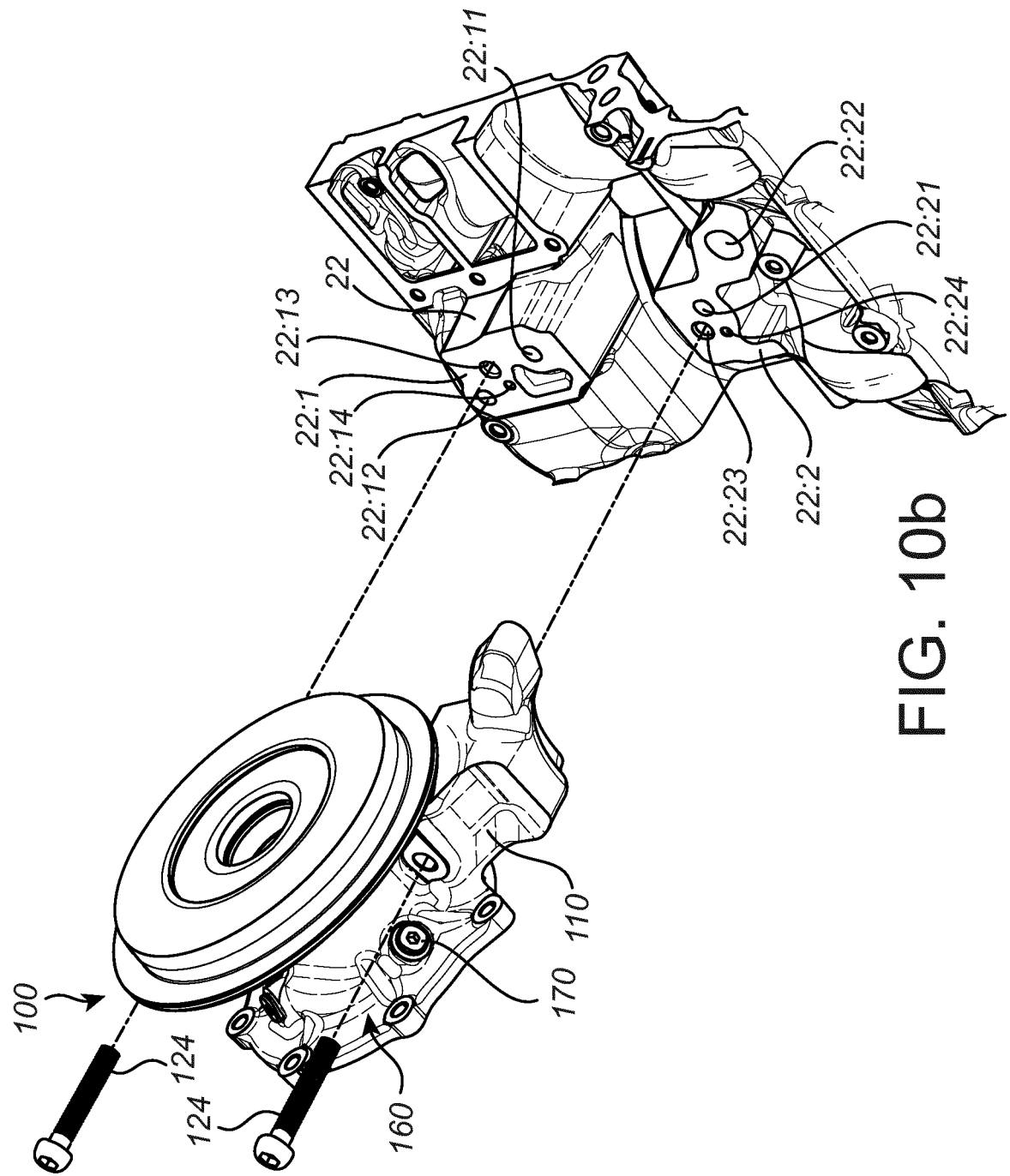
FIG. 10b is an exploded view of a turbocharger unit, an engine structure, and parts of a cylinder block according to an embodiment.
Figure 10C:
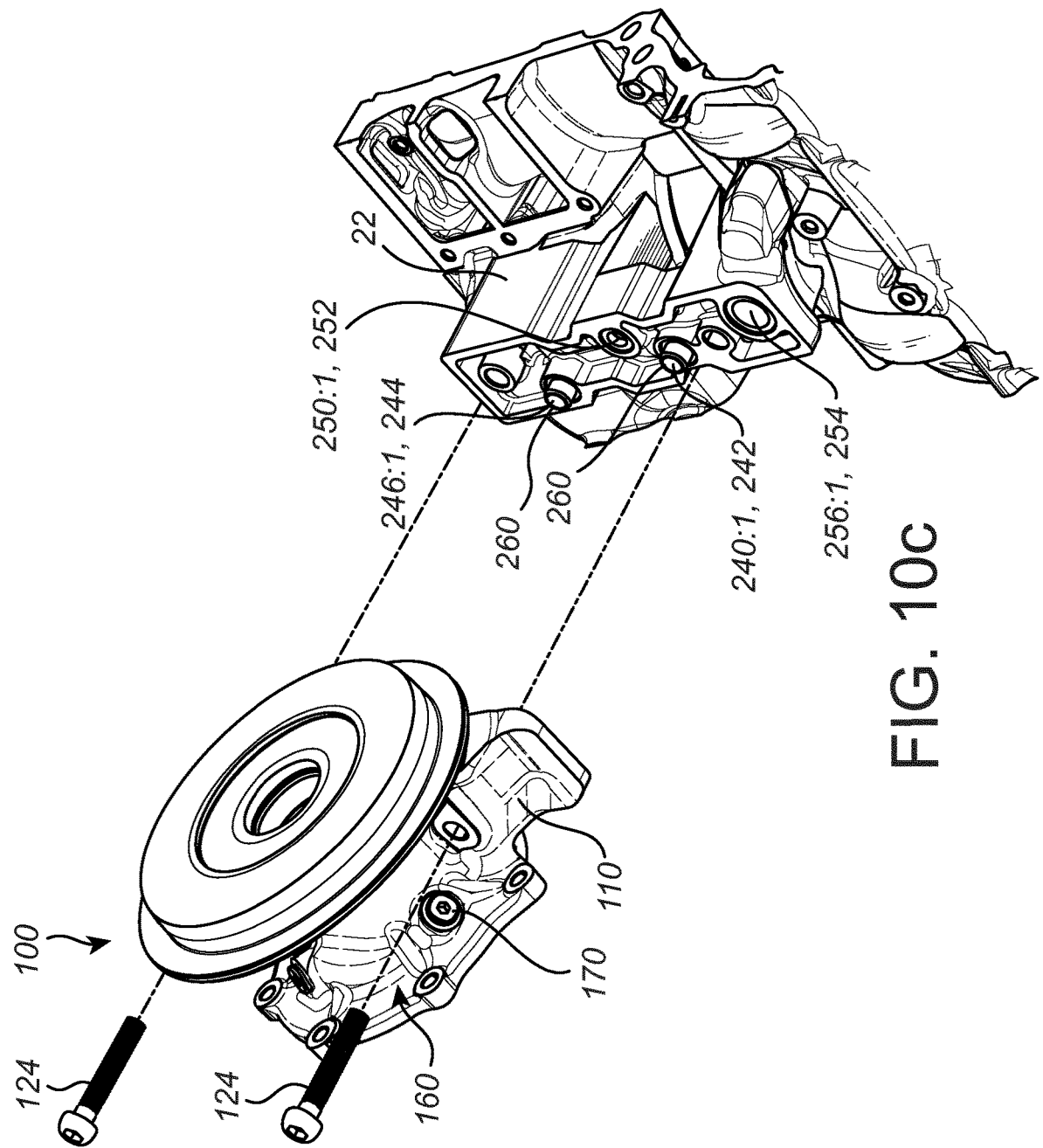
FIG. 10c is an exploded view of a turbocharger unit, an engine structure, and parts of a cylinder block according to an embodiment.

FIG. 10b shows an embodiment where the engine structure 200 is integrally formed with the bearing housing 110. FIG. 10c shows an embodiment where the engine structure 200 is integrally formed with the cylinder block 22.

Figure 11:
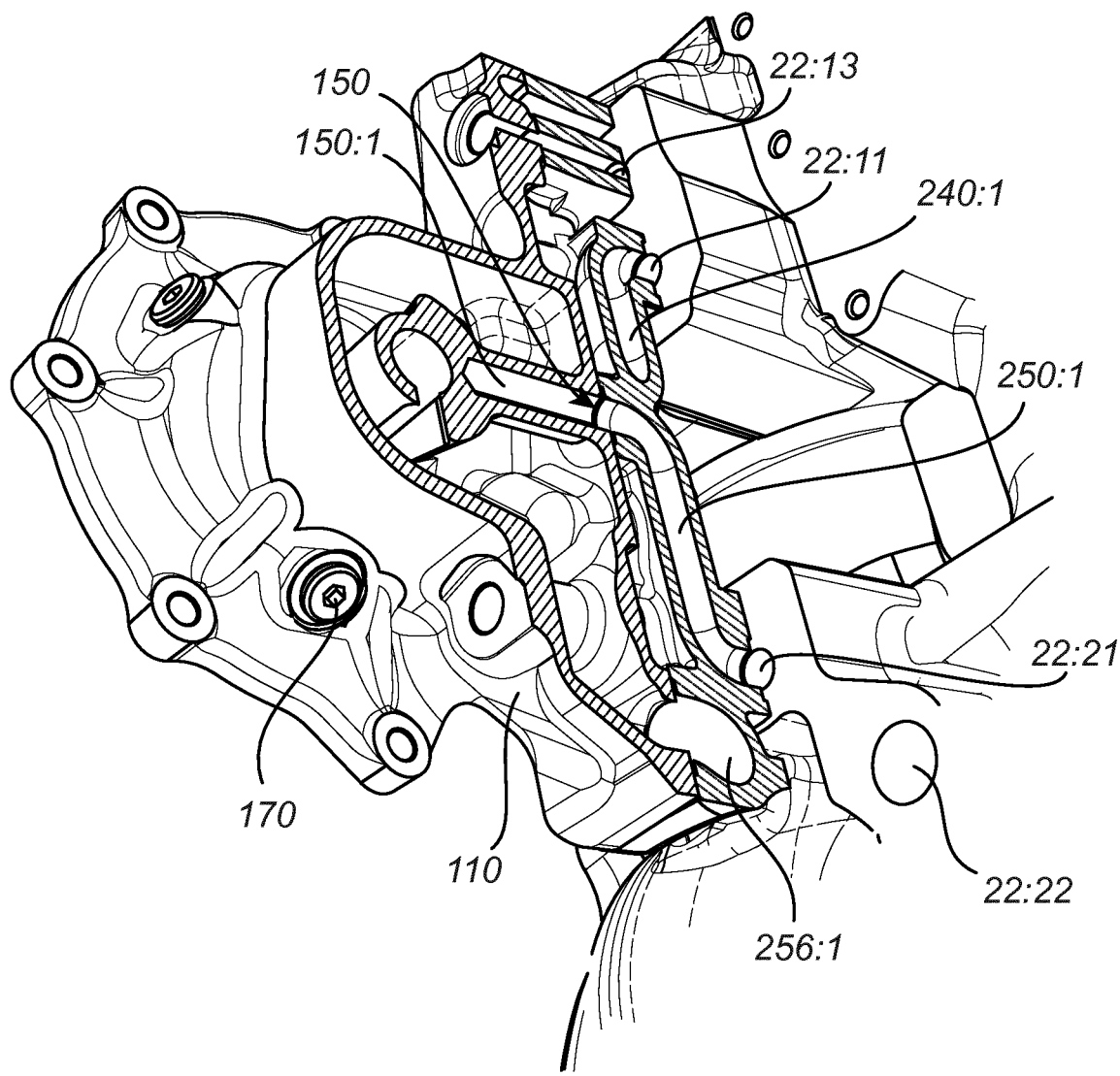
Figure 12:
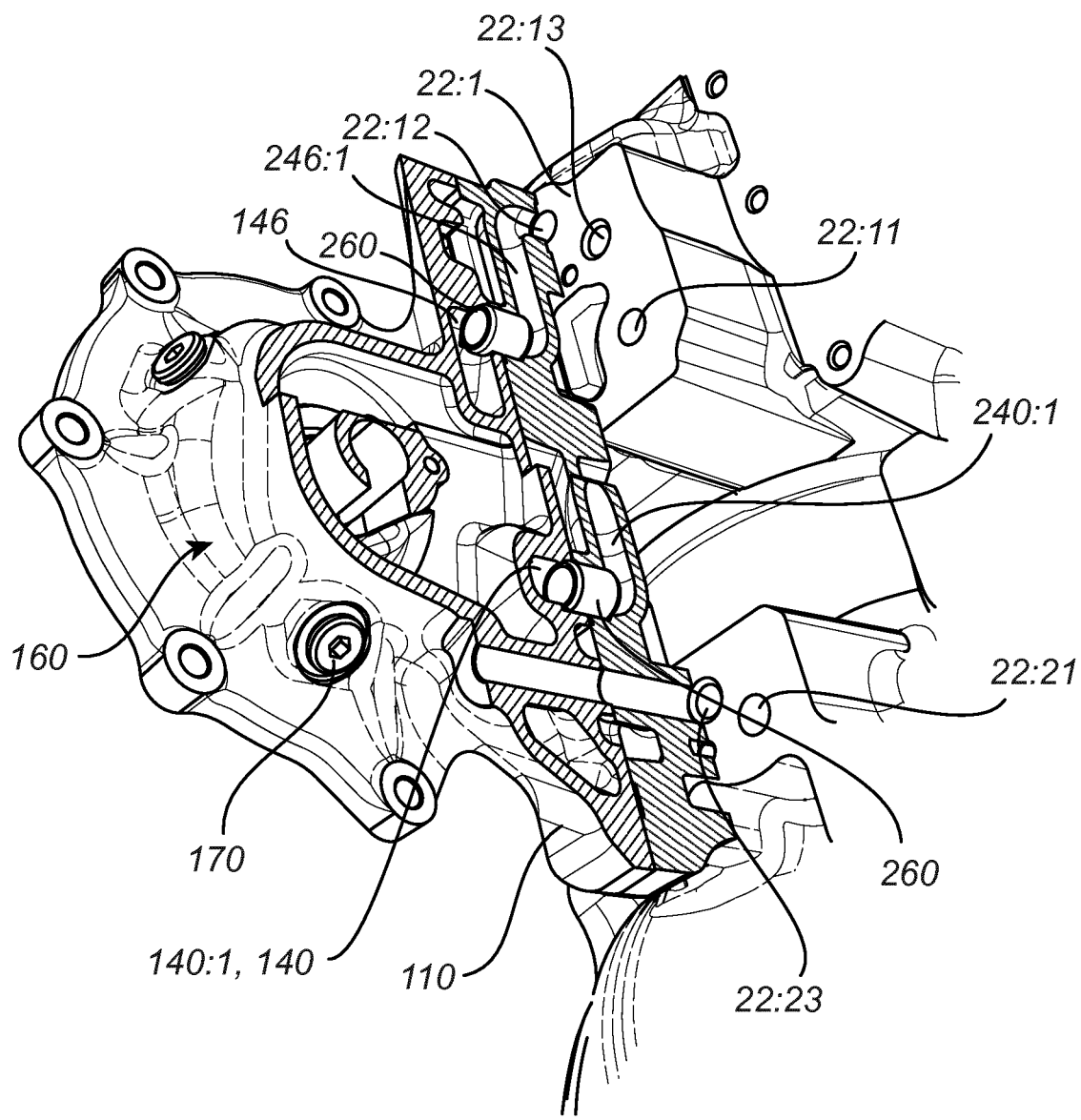

An example is shown in FIGS. 11 and 12, wherein FIG. 11 shows the lubrication channels 250:1, 256:1 of the engine structure 200. As can be seen in FIG. 11 the turbocharger unit 100 has a lubrication supply channel 150:1 extending at the center of the turbocharger unit 100. The inlet 150 of the lubrication supply channel 150:1 is displaced relative the lubrication outlet port 22:21 of the cylinder block 22, however the lubrication fluid flows perfectly into the lubrication supply channel 150:1 of the turbocharger unit 100 via the engine structure 200. Further to this, the lubrication outlet 156 of the turbocharger unit 100 is displaced relative the lubrication inlet port 22:22 of the cylinder block 22, however the lubrication fluid flows perfectly into the lubrication inlet port 22:22 of the cylinder block 22 via the engine structure 200.

The same applies for the coolant flow. As is shown in particular in FIG. 12, the turbocharger unit 100 has a coolant supply channel 140:1 extending at a lower portion of the turbocharger unit 100. The inlet 140 of the coolant supply channel 140:1 is displaced relative the coolant outlet port 22:11 of the cylinder block 22, however the coolant fluid flows perfectly into the coolant supply channel 140:1 of the turbocharger unit 100 via the engine structure 200. Further to this, the coolant outlet 146 of the turbocharger unit 100 is displaced relative the coolant inlet port 22:12 of the cylinder block 22, however the coolant fluid flows perfectly into the coolant inlet port 22:12 of the cylinder block 22 via the engine structure 200.

The respective positions of the fluid ports 140, 146, 150, 156 of the turbocharger unit 100 relative the positions of the fluid ports 22:11, 22:12, 22:21, 22:22 of the cylinder block 22 are shown in FIG. 13, however the fluid ports of the cylinder block 22 are represented by the corresponding fluid ports 240, 246, 250, 256 of the engine structure 200.

Figure 14A:
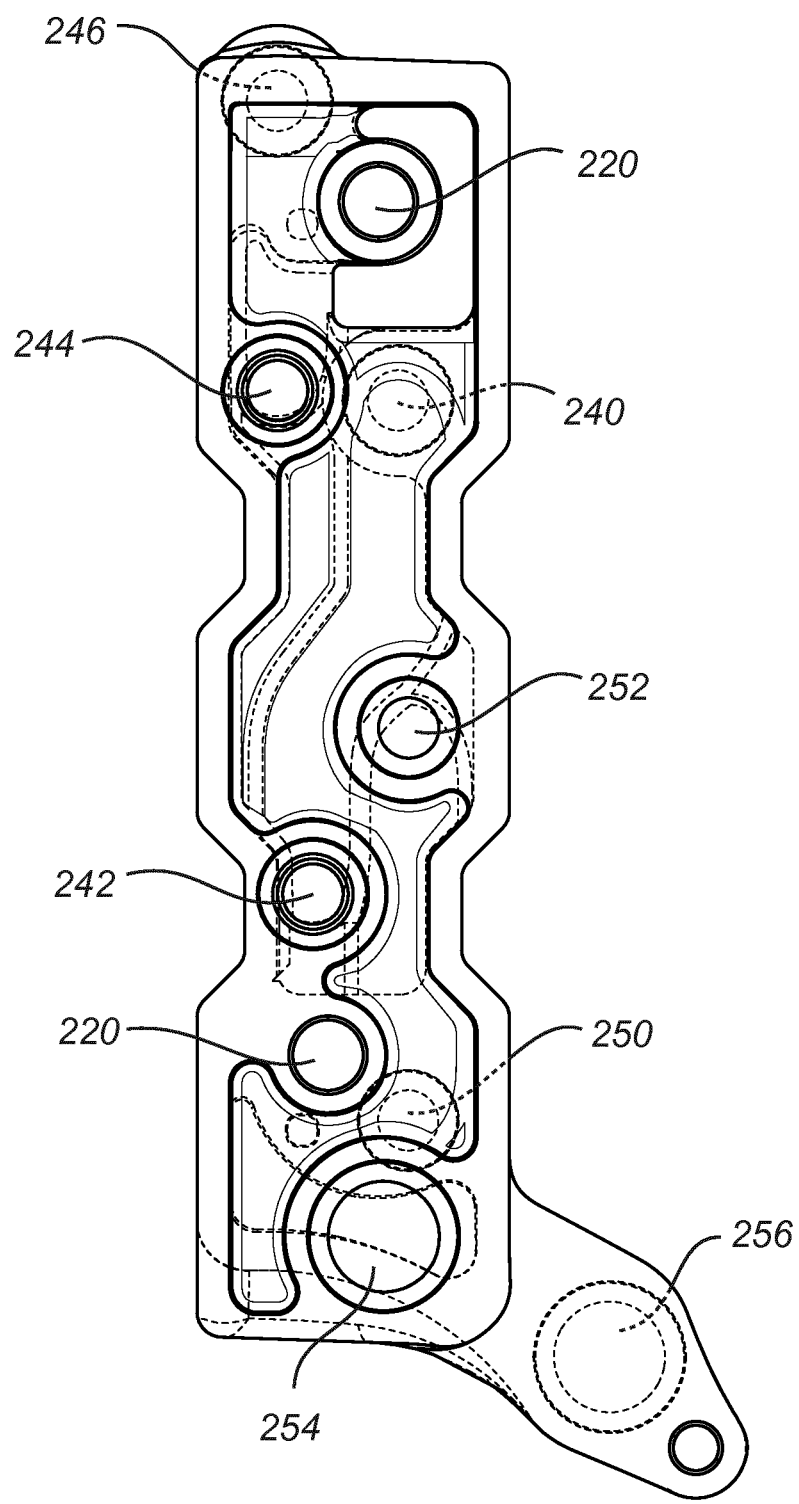
FIG. 14a shows an engine structure according to an embodiment, viewed from the engine side.

In FIG. 14a the engine structure 200 is further shown. As can be seen, all fluid channels i.e. the coolant fluid supply channel extending between ports 240, 242, the coolant fluid return channel extending between ports 244, 246, the lubrication fluid supply channel extending between ports 250, 252, and the lubrication fluid return channel extending between ports 254, 256 are bent. This means that the fluid channels are not simply through holes, but in fact extend in height direction and/or width direction of the engine structure 200.

Another embodiment of an engine structure 200 is shown in FIG. 14b. Here, all fluid channels i.e. the coolant fluid supply channel extending between ports 240, 242, the coolant fluid return channel extending between ports 244, 246, the lubrication fluid supply channel extending between ports 250, 252, and the lubrication fluid return channel extending between ports 254, 256 are bent or curvilinear. This means that the fluid channels are not simply through holes, but in fact extend in height direction and/or width direction of the engine structure 200. However, the fluid port 246 is not provided on the surface facing the cylinder block 22, but is instead arranged as a pipe extending from a surface being distinct from the surface to be in contact with the cylinder block 22. It should be realized that the use of banjo fittings are not only possible for the coolant return, but it could be used for any fluid connection between the engine structure 200 and the cylinder block 22.

Figure 15:
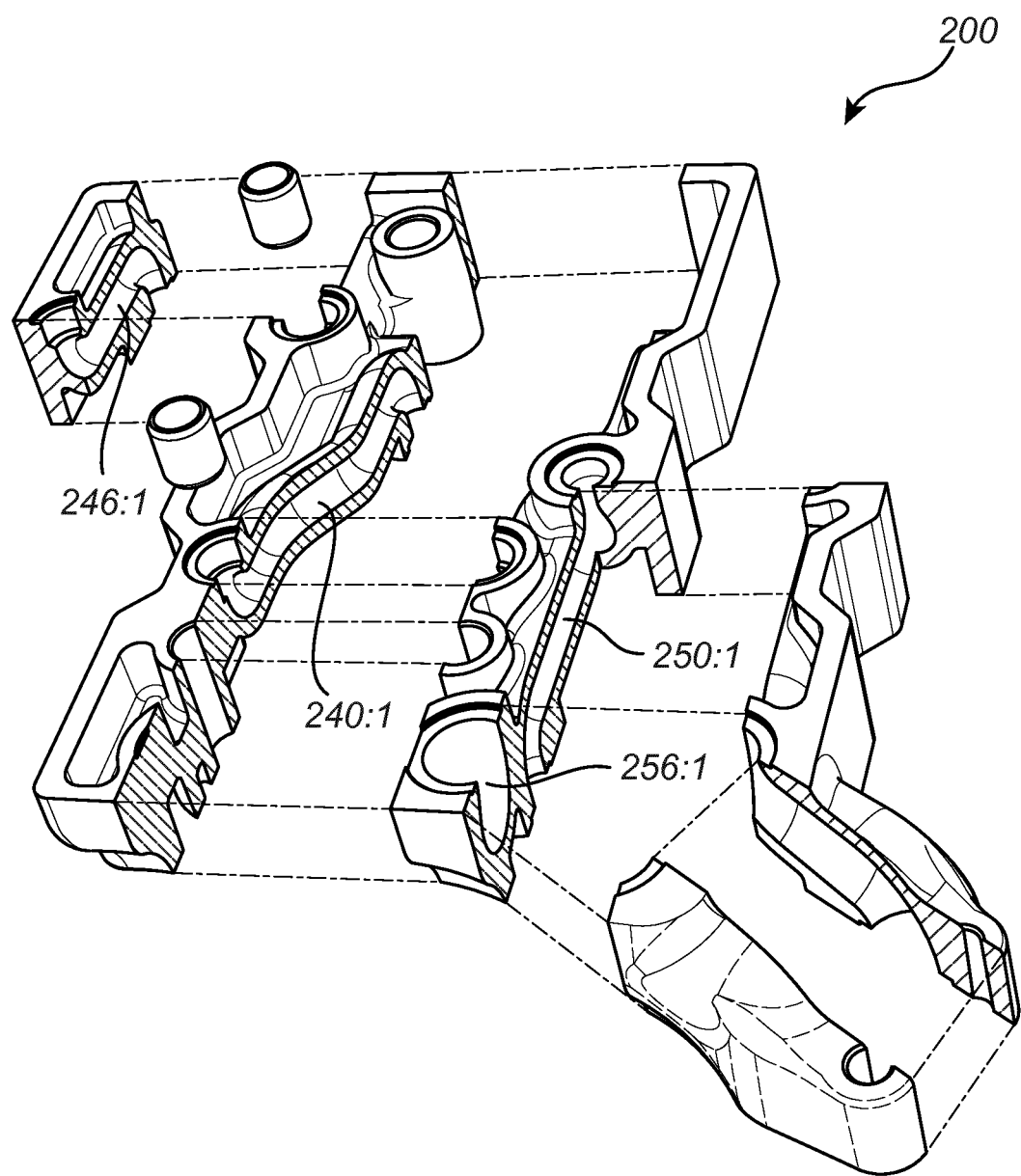

Turning to FIG. 15, the bent manner of the fluid channels 240:1, 246:1, 250:1, 256:1 is further shown. A fluid channel extending in a bent manner should hence be interpreted as a fluid channel of which the cross-sectional positions of the two ports, between which the fluid channel is extending, are different. In other words, a normal from the center axis of one of the ports is not identical as the normal from the center axis of the other port.

Should there be a need for replacing the turbocharger unit 100, it will be necessary to dismount the turbocharger unit 100 from the engine structure 200. In order for facilitating this procedure, the turbocharger unit 100 is provided with some particular advantages. Firstly returning back to FIG. 10, the turbocharger unit 100 has a coolant jacket 160 arranged inside the bearing housing 110. The coolant jacket 160 forms a closed space in which coolant fluid flows. The coolant fluid enters the coolant jacket 160 from the coolant fluid inlet port 140, and exits the coolant jacket 160 at the coolant fluid outlet port 146. When the vehicle is standing still having its engine shut off, there will be coolant fluid present in the coolant jacket 160 as well as in the engine structure 200. A drain plug 170 is therefore provided in the bearing housing 110 of the turbocharger unit 100. The drain plug 170 is positioned at a lower part of the cooling jacket 160 such that when the drain plug 170 is removed (or partly open), coolant fluid present inside the cooling jacket 160 as well as inside the engine structure 200 will be drained. Opening of the drain plug 170 is preferably performed prior to dismounting the turbocharger unit 100 from the engine structure 200.

In FIG. 10 the coolant fluid ports 242, 244 of the engine structure 200 are provided with pipes 260 for preventing coolant fluid to escape into the lubrication fluid channels 250:1, 256:1 during disassembly of the turbocharger unit 100 from the engine structure 200. In order to ensure that no coolant fluid flows out from the turbocharger unit 100 until the turbocharger unit 100 is completely removed from the engine structure 200, the coolant fluid ports 140, 146 of the bearing housing 110 are provided with means 148 for sealing against the pipes 260. Each sealing means 148 may either be provided as an O-ring surrounding an associated pipe 260, or as a tight fit configuration of the dimensions of the ports 140, 146 for preventing leakage of coolant fluid.

Again returning to FIG. 13 the back side of the bearing housing 110, i.e. the side of the turbocharger unit 100 facing the engine structure 200 has sunken areas, or depressions 180 surrounding the through holes 122 used for receiving the screws 124. The depressions 180 are provided in order to reduce weight of the bearing housing 110, but more importantly to distribute the force applied when tightening the screws 124 to the outer periphery of the bearing housing 110. Hence the depressions 180 extend from an outer portion of the bearing housing 110 towards the through holes 122, but ends just before reaching the through hole 122 so that a support surface is formed around the through hole 122. In this particular embodiment the support surface is circular, however other shapes may also be utilized such as rectangular etc. During tightening of the screws 124 a certain amount of force will be applied to the support surface surrounding the through hole 122, while the remaining force will be applied to the outer portion of the bearing housing 110. Preferably, each depression 180 surrounds the entire through hole 122. However, in an alternative embodiment the depression 180 only surrounds a part of the through hole 122, while a corresponding depression, arranged at the surface of the engine structure 200 to be in contact with the bearing housing 100, is designed such that the two depressions form a joint depression surrounding the entire through hole 122. The depressions 180 are preferably dimensioned in relation to the frame, or outer portion of the bearing housing 110 in order to reduce the stresses at the through holes 122, and at the same time distribute the load outwards such that the turbocharger unit 100 will be rigidly attached.

The provision of depressions 180 around the through holes 122 has a further advantage, namely that a sufficiently rigid attachment may be accomplished using only two screws/bolts.

This fact provides an additional advantage, namely that the engine structure 200 may be relatively narrow thus reducing the required length of the turbine shaft inside the bearing housing 110. Journalling of the rotating components of the turbocharger unit 100 may thus be simplified, and weight will be reduced. Further to this, packaging is simplified.

The present disclosure thus presents the use of an engine structure 200 used for attaching the turbocharger unit 100 to the cylinder block 22. As has been described above, the engine structure 200 may either be a separate part or integrated with the bearing housing 110 of the turbocharger unit 100, or integrated with the cylinder block 22. In the first case, where the engine structure 200 is a separate part the depressions 180 may be provided on one or two end faces of the engine structure 200, i.e. the side of the engine structure 200 facing the bearing housing 110 and/or the side of the engine structure 200 facing the cylinder block 22. In the other cases, where the engine structure 200 is integrated with either the bearing housing 110 or the cylinder block 22, the depressions 180 are provided on the side of the engine structure 200 to be connected.

In any one of the above-mentioned alternatives, the depressions may be formed on two contacting surfaces of the turbocharger unit 100/cylinder block 22 interface. Hence, a depression may be jointly formed by a partial depression on the side of the engine structure 22 facing the cylinder block 22, and an associated partial depression on the cylinder block 22. The similar applies to the side of the engine structure 200 facing the bearing housing 110 and the bearing housing 110 itself. These jointly formed depressions could also be provided by a fully surrounding depression on the cylinder block 22, on the engine structure 200, and/or the bearing housing.

Now turning to FIGS. 16a-c methods according to various embodiments will be described. Starting with FIG. 16a, a method 400 for attaching a turbocharger unit 100 to a cylinder block 22 comprises a first step 402 of connecting an engine structure 200 to the cylinder block 22. This is preferably performed by optionally aligning the engine structure 200 with the cylinder block 22, e.g. by means of pins/recesses, and tightening one or several screws for pressing the engine structure 200 towards the cylinder block 22. Further to this, an additional step 404 may be provided which includes connecting fluid ports, such as coolant inlets, coolant outlets, lubricant inlets, lubricant outlets of the engine structure 200 with associated fluid supplies; one or several gaskets, O-rings, etc. may be used to seal the fluid ports. A subsequent step 406 is performed in which a bearing housing 110 of the turbocharger unit 100 is securely attached to the engine structure 200. Step 406 may be improved by providing a gasket, or O-rings between the bearing housing 110 and the engine structure 200. As described above, the bearing housing 110 forms part of means for securely attaching the turbocharger unit 100 to the engine structure 200 such that at least one fluid inlet and/or fluid outlet of the bearing housing 110 is aligned with a corresponding fluid outlet and/or fluid inlet of the engine structure 200. The method 400 may further include steps of providing electrical connections, between the cylinder block 22 and the engine structure 200 and/or between the engine structure 200 and the bearing housing 110. The electrical connections may be established automatically during step 402 and/or step 406.

In FIG. 16b a method 400' is schematically shown. The method 400' is performed in order to remove a turbocharger unit 100 from a cylinder block 22, which turbocharger unit 100 comprises a bearing housing 110 being attached to an engine structure 200 such that at least one fluid outlet and/or fluid inlet of the engine structure 200 is aligned with a corresponding fluid inlet and/or fluid outlet of the bearing housing 110. The method comprises a single step 402' of removing the turbocharger unit 100 from the engine structure 200 without removing the engine structure 200 from the cylinder block 22. The engine structure 200 is arranged remotely from the exhaust inlet 102 of the turbocharger unit 100.

In FIG. 16c a further method 400" is schematically shown. The method 400" is performed for replacing a turbocharger unit 100, and comprises a first step 402" of removing the turbocharger unit 100 from the engine structure 200 without removing the engine structure 200 from the cylinder block 22, i.e. step 402' of method 400'. A subsequent step 404" is thereafter performed in which a bearing housing 110 of a new turbocharger unit 100 is securely attached to the engine structure 200. As previously described, the bearing housing 110 forms part of means for securely attaching the turbocharger unit 100 to the engine structure 200 such that at least one fluid inlet and/or fluid outlet of the bearing housing 110 is aligned with a corresponding fluid outlet and/or fluid inlet of the engine structure 200.

The general concept of attaching a turbocharger unit 100 to a cylinder block 22 via an engine structure 200, arranged remotely from the exhaust inlet 102 of the turbocharger unit 100, provides a number of advantages. For example, such assembly will be more robust in terms of vibration, and in case of a variable geometry turbine the risk for vane sticking will be reduced.

Such assembly will also provide better control of tip clearance when the weight of the turbocharger unit 100 is not carried by turbine housing 104b, but instead by the bearing housing 110 used for attaching the turbocharger unit 100 to the engine structure 200. Further to this, such assembly also allows for new designs of associated exhaust manifolds 42, since these may be made of thinner material which besides being of less weight, also are capable of withstanding higher temperatures.

One particular advantage is related to pipe routing. Pipes are required for connecting the turbocharger unit 100 with e.g. coolant and lubricant supplies. Instead of requiring these piping to be connected to the bearing housing 110 directly, these are instead connected to the engine structure 200. Hence, when replacing a turbocharger unit 100 the piping will not be subject for removal. This particular advantage is best illustrated in FIGS. 14a and 14b described above. Since the engine structure 200 can be constructed in many various ways it allows for great flexibility of pipe routing. Pipe routing will be even simpler for the embodiments described with reference to FIG. 7b, in which at least some of the fluid ports of the engine structure 200 are in direct connection with corresponding ports of the cylinder block 22. The same advantages are also applicable for electrical connectors in accordance with the description above.

In further embodiments the use of an engine structure 200 may be advantageous for providing a common interface for different turbocharger units. For example, cylinder blocks may be manufactured in a very few number of configurations, while the number of different turbocharger units is significantly higher. For a case in which the cylinder block allows for lubricant supply as well as coolant supply to the turbocharger unit, a specific engine structure may be chosen which provides fluid channels between the cylinder block and the turbocharger unit. However, should a selected turbocharger unit not be configured to allow for cooling a different kind of engine structure may be selected, for which the water ports are blinded or shut off. Hence the engine structure may provide lubricant channels, while at the same time providing a lid for the coolant ports of the cylinder block. Following this reasoning a few number of different engine structures may provide the required number of interfaces for connecting a very large number of different turbocharger units to a fewer number of cylinder blocks.

The above description includes different embodiments, all related to attaching a bearing housing of a turbocharger unit to a cylinder block via an engine structure. The engine structure, forming an adapter for the bearing housing/cylinder block interface, may either be a separate component or it may be integrated with the bearing housing or the cylinder block. For the embodiments in which the engine structure is a separate component it has been described to attach the engine structure to the cylinder block, and thereafter mounting the turbocharger unit to the engine structure. It may however also be possible to provide attachment means such that the engine structure is initially mounted to the bearing housing, and such that the engine structure/bearing housing assembly is subsequently mounted to the cylinder block.

It is to be understood that the present invention is not limited to the embodiments described above and illustrated in the drawings; rather, the skilled person will recognize that many changes and modifications may be made within the scope of the appended claims.

The invention claimed is:

1. An engine structure forming an adapter for connecting a turbocharger unit to a cylinder block of an internal combustion engine, comprising:
at least one through hole for fastening the turbocharger unit to the cylinder block via the engine structure such that the engine structure is positioned in between the turbocharger unit and the cylinder block; and
at least one fluid channel extending in a bent manner from a first surface of the engine structure to a second surface of the engine structure,
wherein the first surface is configured to bear on the cylinder block, and the second surface is configured to bear on the turbocharger unit,
wherein the at least one through hole is configured for receiving a fastener insertable through an opening of the turbocharger unit, such that the fastener is further engaging with an aligned bore of the cylinder block,
wherein the engine structure is configured for releasably connecting to the turbocharger unit, and
wherein at least one of a fluid inlet and a fluid outlet comprises a dam.

2. The engine structure according to claim 1, wherein the engine structure is one of integrally formed with the cylinder block, and configured for releasably connecting to the cylinder block.

3. The engine structure according to claim 2, wherein the engine structure is configured for releasably connecting to the cylinder block further comprises at least one additional through hole for securely attaching the engine structure to the cylinder block.

4. The engine structure according to claim 3, wherein the engine structure further comprises at least one guiding pin for mating engagement with a corresponding guiding recess of the cylinder block.

5. The engine structure according to claim 3, wherein the at least one additional through hole extends to a back side of the engine structure facing the cylinder block, and wherein the engine structure comprises a depression at least partly surrounding the additional through hole.

6. The engine structure according to claim 1, wherein at least one of a fluid outlet and a fluid inlet comprises a pipe extending out from the engine structure.

7. The engine structure according to claim 1, wherein the second surface configured to bear on the turbocharger unit is provided with a divider for preventing coolant fluid mixing with lubricating fluid during disassembly of the turbocharger unit from the engine structure.

8. The engine structure according to claim 1, wherein the first surface configured to bear on the cylinder block is provided with a divider for preventing coolant fluid mixing with lubricating fluid during disassembly of the turbocharger unit from the cylinder block.

9. The engine structure a cording according to claim 1, wherein the engine structure further comprises at least one guiding pin for mating engagement with a corresponding guiding recess of at least one of the bearing housing and the cylinder block.

10. The engine structure according to claim 1, further comprising a support onto which the turbocharger unit is positioned during mounting.

11. The engine structure according to claim 1, further comprising an actuator being releasably attached to the engine structure.

12. The engine structure according, to claim 1, wherein at least one through hole extends to a back side of the engine structure facing the cylinder block, and wherein the engine structure comprises a depression at least partly surrounding the through hole.

13. The engine structure according to claim 1, wherein the at least one through hole extends to a front side of the engine structure facing the turbocharger unit, and wherein the engine structure comprises a depression at least partly surrounding the through hole.

14. A turbocharger unit comprising:
a bearing housing having at least one through hole for fastening the turbocharger unit to a cylinder block of an internal combustion engine via an engine structure, the engine structure having
at least one through hole for fastening the turbocharger unit to the cylinder block via the engine structure such that the engine structure is positioned in between the turbocharger unit and the cylinder block; and
at least one fluid channel extending in a bent manner from a first surface of the engine structure to a second surface of the engine structure,
wherein the first surface is configured to bear on the cylinder block, and the second surface is configured to bear on the turbocharger unit, wherein the at least one through hole is configured for receiving a fastener insertable through an opening of the turbocharger unit such that the fastener is further engaging with an aligned bore of the cylinder block, wherein the engine structure is configured for releasably connecting to the turbocharger unit, and wherein at least one of a fluid inlet and a fluid outlet comprises a dam,
wherein the bearing housing comprises at least one plug for draining coolant fluid from the bearing housing and from the engine structure, and wherein the plug is in fluid communication with a coolant jacket of the bearing housing.

15. The turbocharger unit according to claim 14, wherein the engine structure further comprises at least one guiding recess for mating engagement with a corresponding guiding pin of at least one of the bearing housing and the cylinder block.

16. A turbocharger unit comprising:
a bearing housing having at least one through hole for fastening the turbocharger unit to a cylinder block of an internal combustion engine via an engine structure, the engine structure having
at least one through hole for fastening the turbocharger unit to the cylinder block via the engine structure such that the engine structure is positioned in between the turbocharger unit and the cylinder block; and
at least one fluid channel extending in a bent manner from a first surface of the engine structure to a second surface of the engine structure,
wherein the first surface is configured to bear on the cylinder block, and the second surface is configured to bear on the turbocharger unit, wherein the at least one through hole is configured for receiving a fastener insertable through an opening of the turbocharger unit such that the fastener is further engaging with an aligned bore of the cylinder block, wherein the engine structure is configured for releasably connecting to the turbocharger unit,
wherein the engine structure is one of integrally formed with the cylinder block, and configured for releasably connecting to the cylinder block, wherein the engine structure is configured for releasably connecting to the cylinder block further comprises at least one additional through hole for securely attaching the engine structure to the cylinder block, wherein the at least one additional through hole extends to a back side of the engine structure facing the cylinder block, and wherein the engine structure comprises a depression at least partly surrounding the additional through hole,
wherein the bearing housing comprises at least one fluid port for alignment with a corresponding fluid port of the engine structure, and wherein the fluid port of the bearing housing is configured to seal against a pipe extending out from the fluid port of the engine structure.

17. The turbocharger unit according to claim 16, wherein the engine structure further comprises at least one guiding recess for mating engagement with a corresponding guiding pin of the cylinder block.

18. A turbocharger unit comprising:
a bearing housing having at least one through hole for fastening the turbocharger unit to a cylinder block of an internal combustion engine via an engine structure, the engine structure having
at least one through hole for fastening the turbocharger unit to the cylinder block via the engine structure such that the engine structure is positioned in between the turbocharger unit and the cylinder block; and
at least one fluid channel extending in a bent manner from a first surface of the engine structure to a second surface of the engine structure,
wherein the first surface is configured to bear on the cylinder block, and the second surface is configured to bear on the turbocharger unit, wherein the at least one through hole is configured for receiving a fastener insertable through an opening of the turbocharger unit, such that the fastener is further engaging with an aligned bore of the cylinder block, wherein the engine structure is configured for releasably connecting to the turbocharger unit, and wherein at least one of a fluid inlet and a fluid outlet comprises a dam,
wherein at least one through hole extends to a back side of the bearing housing facing at least one of the engine structure and the cylinder block, and wherein the bearing housing comprises a depression at least partly surrounding one through hole.

19. An exhaust system for an internal combustion engine, comprising:
a turbocharger unit; and
an engine structure for attaching the turbocharger unit to a cylinder block of the internal combustion engine,
wherein the engine structure comprises
at least one through hole for fastening the turbocharger unit to the cylinder block via the engine structure such that the engine structure is positioned in between the turbocharger unit and the cylinder block; and,
at least one fluid channel extending in a bent manner from a first surface of the engine structure to a second surface of the engine structure,
wherein the first surface is configured to bear on the cylinder block, and/or the second surface is configured to bear on the turbocharger unit, wherein the at least one through hole for receiving a fastener insertable through an opening of the turbocharger unit, such that the fastener is further engaging with an aligned bore of the cylinder block, wherein the engine structure is configured for releasably connecting to the turbocharger unit, wherein at least one of a fluid inlet and a fluid outlet comprises a dam, and
wherein the turbocharger unit comprises:
a bearing housing having at least one opening for fastening the turbocharger unit to a cylinder block of an internal combustion engine via the engine structure,
wherein the bearing housing comprises at least one plug for draining coolant fluid from the bearing housing and from the engine structure, and wherein the plug is in fluid communication with a coolant jacket of the bearing housing.

* * * * *